US012772048B2

(12) United States Patent
Muñoz De La Torre Alonso et al.

(10) Patent No.: US 12,772,048 B2
(45) Date of Patent: Oct. 20, 2026

(54) FIRST NODE, SECOND NODE, THIRD NODE AND METHODS PERFORMED THEREBY, FOR HANDLING ENCRYPTED TRAFFIC IN A COMMUNICATIONS NETWORK

(71) Applicant: Telefonaktiebolaget LM Ericsson (publ), Stockholm (SE)

(72) Inventors: Miguel Angel Muñoz De La Torre Alonso, Madrid (ES); Miguel Angel Puente Pestaña, Madrid (ES); Antonio Cañete Martinez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 362 days.

(21) Appl. No.: 18/271,969

(22) PCT Filed: Feb. 9, 2021

(86) PCT No.: PCT/EP2021/053040
§ 371 (c)(1),
(2) Date: Jul. 12, 2023

(87) PCT Pub. No.: WO2022/152405
PCT Pub. Date: Jul. 21, 2022

(65) Prior Publication Data

US 2024/0073680 A1 Feb. 29, 2024

(30) Foreign Application Priority Data

Jan. 15, 2021 (EP) .................................... 21382024

(51) Int. Cl.
*H04W 12/033* (2021.01)
*H04W 12/0431* (2021.01)

(52) U.S. Cl.
CPC ..... *H04W 12/033* (2021.01); *H04W 12/0431* (2021.01)

(58) Field of Classification Search
CPC ............... H04W 12/03; H04W 12/033; H04W 12/0431; H04W 12/80; H04L 63/0428; H04L 63/306
See application file for complete search history.

(56) References Cited

U.S. PATENT DOCUMENTS 7,590,844 B1 * 9/2009 Sherman ............... H04L 9/3271 380/255
11,516,004 B2 * 11/2022 Raza ..................... H04L 63/068
(Continued)

FOREIGN PATENT DOCUMENTS

WO 2003058879 A1 7/2003
WO 2020116915 A1 6/2020
WO WO-2020131740 A1 * 6/2020 ......... H04L 63/0428

OTHER PUBLICATIONS

Intel, "Solution of Encrypted Traffic Detection for key issue#2", SA WG2 Temporary Document, SA WG2 Meeting #S2-127, Apr. 16-Apr. 20, 2018, Sanya, China, pp. 1-4, S2-183649, 3GPP.*
(Continued)

*Primary Examiner* — Lizbeth Torres-Diaz
(74) *Attorney, Agent, or Firm* — COATS & BENNETT, PLLC

(57) ABSTRACT

A computer-implemented method, performed by a first node (111). The method is for handling encrypted traffic in a communications system (100). The first node (111) receives (304), from a second node (112) one or more keys to enable decryption by a third node (113) of traffic. The traffic is routed between two or more endpoints (130, 120) and is encrypted between the endpoints (130, 120) The first node (111) also receives (304) the one or more indications. The one or more indications indicate a respective protocol to be used with the one or more keys to enable decryption of the traffic. The first node (111) also initiates (305) sending the one or more keys and the one or more indications to the third
(Continued)

node (113), thereby enabling decryption of the traffic. The first node (111) and the third node (113) are different from any of the two or more endpoints (130, 120).

19 Claims, 18 Drawing Sheets

(56) References Cited

U.S. PATENT DOCUMENTS 12,309,295 B2 * 5/2025 Bulusu ................ H04L 63/1416
2004/0139336 A1 * 7/2004 McLean .................... H04L 9/12 713/189
2015/0381657 A1 * 12/2015 Kelson ................ H04L 63/0281 713/153
2016/0234197 A1 * 8/2016 Näslund .............. H04L 63/0807
2017/0013453 A1 * 1/2017 Lee ..................... H04W 12/037
2019/0349340 A1 * 11/2019 Zhang ................. H04W 12/041
2020/0059786 A1 * 2/2020 Farag .................... H04L 9/3236
2020/0100102 A1 * 3/2020 Xu ...................... H04W 12/033
2020/0259853 A1 * 8/2020 Alfano ................ H04L 43/0876
2021/0176636 A1 * 6/2021 Torvinen ............... H04L 9/3242
2023/0232219 A1 * 7/2023 Mao .................... H04L 63/0272 455/411

OTHER PUBLICATIONS

3rd Generation Partnership Project, "3rd Generation Partnership Project;Technical Specification Group Core Network and Terminals;5G System; Network Exposure Function Northbound APIs;Stage 3(Release 16)", Technical Specification, 3GPP TS 29.522 V16.5.0, Sep. 2020, pp. 1-161, 3GPP, France.

3rd Generation Partnership Project, "3rd Generation Partnership Project; Technical Specification Group Services and System Aspects; Study on encrypted traffic detention and verification (Release 16)", Technical Report, 3GPP TR 23.787 v0.4.0, Jun. 2018, pp. 1-46, 3GPP, France.

* cited by examiner a)

b)

a)

b)

a)

b)

a)

FIRST NODE, SECOND NODE, THIRD NODE AND METHODS PERFORMED THEREBY, FOR HANDLING ENCRYPTED TRAFFIC IN A COMMUNICATIONS NETWORK

TECHNICAL FIELD

The present disclosure relates generally to a first node and methods performed thereby for handling encrypted traffic in a communications network. The present disclosure also relates generally to a second node, and methods performed thereby for handling encrypted traffic in a communications network. The present disclosure further relates generally to a device and methods performed thereby for handling encrypted traffic in a communications network. The present disclosure also relates generally to computer programs and computer-readable storage mediums, having stored thereon the computer programs to carry out these methods.

BACKGROUND

Computer systems in a communications network may comprise one or more network nodes. A node may comprise one or more processors which, together with computer program code may perform different functions and actions, a memory, a receiving port and a sending port. A node may be, for example, a server. Nodes may perform their functions entirely on the cloud.

The standardization organization 3GPP is currently in the process of specifying a New Radio Interface called NR or 5G-UTRA, as well as a Fifth Generation (5G) Packet Core Network, which may be referred to as 5G Core Network, abbreviated as 5GC.

A 3GPP system comprising a 5G Access Network (AN), a 5G Core Network and a UE may be referred to as a 5G system.

FIG. 1 is a schematic diagram depicting a particular example of a 5GC architecture as defined by 3GPP, which may be used as a reference for the present disclosure. An Application Function (AF) 1 may interact with the 3GPP Core Network through a Network Exposure Function (NEF) 2. The NEF may support different functionality and specifically in the context of this document, the NEF may act as an entry point for may external AF into the network of the operator. A Network Repository Function (NRF) 3 may support registration and discovery procedures. The Session Management Function (SMF) 4 may support different functionality, e.g., Session Establishment, modify and release, and policy related functionalities such as termination of interfaces towards policy control functions, charging data collection, support of charging interfaces and control and coordination of charging data collection at the User Plane function (UPF) 5. Specifically, for the context of this document, the SMF 4 may receive Policy and Charging Control (PCC) rules from the PCF 7 and may configure the UPF 5 accordingly through the N4 reference point 6, in accordance with the Packet Flow Control Protocol (PFCP) protocol as follows. The SMF 4 may control the packet processing in the UPF 5 by establishing, modifying or deleting PFCP Sessions and by provisioning, e.g., adding, modifying or deleting, Packet Detection Rules (PDRs), Forwarding Action Rules (FARs), Quality of Service Enforcement Rules (QERs) and/or Usage Reporting Rules (URRs) per PFCP session, whereby a PFCP session may correspond to an individual Packet Data Unit (PDU) session or a standalone PFCP session not tied to any PDU session. Each PDR may contain Packet Detection Information (PDI) specifying the traffic filters or signatures against which incoming packets may be matched. Each PDR may be associated to the following rules providing the set of instructions to apply to packets matching the PDI. According to a first rule, one FAR, which may contain instructions related to the processing of the packets, may specifically forward, redirect, duplicate, drop or buffer the packet with or without notifying the Control Plane (CP) function about the arrival of a Downlink (DL) packet. According to a second rule, zero, one or more QERs, which may contain instructions related to the Quality of Service (QoS) enforcement of the traffic. According to a third rule, zero, one or more URRs, which may contain instructions related to traffic measurement and reporting. The UPF 5 may support handling of user plane traffic based on the rules received from the SMF 4, specifically for the context of this document, packet inspection, e.g., through PDRs, and different enforcement actions, such as traffic steering, QoS, Charging/Reporting, e.g., through FARs, QERs and URRs. A Policy Control Function (PCF) 7 may be understood to support a unified policy framework to govern the behavior of the network. The PCF 7 may provide Policy and Charging Control (PCC) rules to the Policy and Charging Enforcement Function (PCEF). The PCF 7 may provide policy rules to a user equipment (UE) 8 through the AMF 9. The AMF 9 may manage access of the UE 8. For example, when the UE 8 may be connected through different access networks, and mobility aspects of the UE 8. Specifically, the AMF 9 may be used to forward UE rules from the PCF 7 to the UE 8. The UE 8 may be understood as a type of device. Devices within a communications network may be user equipments (UEs), e.g., stations (STAs), wireless devices, mobile terminals, wireless terminals, terminals, and/or Mobile Stations (MS). User equipments are enabled to communicate wirelessly in a cellular communications network or wireless communication network, sometimes also referred to as a cellular radio system, cellular system, or cellular network. The communication may be performed e.g., between two user equipments, between a user equipment and a regular telephone, and/or between a user equipment and a server via a Radio Access Network (RAN) 10, and possibly one or more core networks, comprised within the communications network. Devices may further be referred to as mobile telephones, cellular telephones, laptops, or tablets with wireless capability, just to mention some further examples. The devices in the present context may be, for example, portable, pocket-storable, hand-held, computer-comprised, or vehicle-mounted mobile devices, enabled to communicate voice and/or data, via the RAN 10, with another entity, such as another terminal or a server. Also depicted in FIG. 1 are a Network Slice Selection Function (NSSF) 11, a Unified Data Management (UDM) 12, an Authentication Server Function (AUSF) 13 and a Data Network (DN) 14. Each of the NSSF 11, the NEF 2, the NRF 3, the PCF 7, the UDM 12, the AF 1, the AUSF 13, the AMF 9 and the SMF 4 may have an interface through which they may be accessed, which as depicted in the Figure, may be, respectively: Nnssf 15, Nnef 16, Nnrf 17, Npcf 18, Nudm 19, Naf 20, Nausf 21, Namf 22, Nsmf 23. Each of the UE 8, the RAN 10 and the UPF 5 may have an interface through which they may be accessed, which as depicted in the Figure, may be, respectively: N1 24, N2 25 and N4 6. The RAN 10 may have an interface N3 26 with the UPF 5. The UPF 5 may have an interface N6 27 with the DN 14.

The communications network may cover a geographical area which may be divided into cell areas, each cell area being served by another type of node, a network node in the RAN 10, radio network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or Base Transceiver Station (BTS), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as user equipments, with serving beams.

Traffic Encryption and Network Management

Traffic encryption is growing significantly in mobile networks and at the same time, the encryption mechanisms are growing in complexity. Most applications today are not based on HTTP cleartext, but instead they may be based on Hypertext Transport Protocol Secure (HTTPS), e.g., using Transport Layer Security (TLS). Additionally, a significant part of the traffic may now be based on Quick User Datagram Protocol Internet Connection (QUIC) transport. In the future, it is foreseen that most apps will be based on QUIC transport.

Symmetric Encryption

Symmetric-key algorithms may be understood as algorithms for cryptography that may use the same cryptographic keys for both encryption of plaintext and decryption of ciphertext. The keys may be identical or there may be a simple transformation to go between the two keys. The keys, in practice, may be understood to represent a shared secret between two or more parties that may be used to maintain a private information link.

Symmetric-key algorithms may require both the sender and the recipient of a message to have the same secret key. All early cryptographic systems required a mechanism to somehow receive a copy of that secret key over a physically secure channel.

Nearly all modern cryptographic systems may still use symmetric-key algorithms internally to encrypt the bulk of the messages, but they may eliminate the need for a physically secure channel by using Diffie-Hellman key exchange or some other public-key protocol to securely come to agreement on a fresh new secret key for each session, which may be known as forward secrecy.

TLS

TLS, which may be understood as a successor of Secure Sockets Layer (SSL), may be understood a protocol for encrypting communications over a network. TLS may use both asymmetric encryption and symmetric encryption. During a TLS handshake, the client and server may agree upon new keys to use for symmetric encryption, called "secret keys." Each new communication session may start with a new TLS handshake and use new secret keys.

The TLS handshake itself may make use of asymmetric encryption for security while the two sides may generate the secret keys, and in order to authenticate the identity of the origin server of a given website.

QUIC

QUIC may be understood as a UDP-based, stream-multiplexing, encrypted transport protocol. QUIC may be understood as basically a UDP based replacement for Transmission Control Protocol (TCP). QUIC is now under the final steps of standardization at IETF and may rely on TLS 1.3.

While encryption provide security to communications in a communications network, encrypted communications with existing methods may hinder the provision of services by applications in the communications network.

SUMMARY

There are two conflicting aspects regarding traffic encryption in mobile networks. One aspect is that applications may demand privacy and security, so they may use encrypted traffic more and more. It is expected that in a few years practically all internet traffic will be encrypted. Another aspect is that applications may demand to operators traffic management actions that may require traffic visibility. Such traffic management actions may be, for example: traffic redirection, e.g., HTTP based redirection, in order to notify the user e.g., when the subscriber's quota may be expired, content enrichment, e.g., HTTP content enrichment, where the network operator may add information, e.g., Radio Access Technology (RAT) Type, International Mobile Subscriber Identity (IMSI), Mobile Station International Subscriber Directory Number (MSISDN), towards the content provider, e.g., an application server, and parental control, e.g., in order to block traffic to forbidden sites.

It is currently not possible to satisfy both demands at the same time, since in order to apply any of the above traffic management actions, the operator may be understood to need to inspect the traffic, which is not possible as the traffic is encrypted by the application.

It is an object of embodiments herein to improve the handling of encrypted traffic in a communications system.

According to a first aspect of embodiments herein, the object is achieved by a computer-implemented method, performed by a first node. The method is for handling encrypted traffic in a communications system. The first node operates in the communications system. The first node receives, directly, or indirectly, from a second node operating in the communications system: i) one or more keys and one or more indications. The one or more keys are to enable decryption by a third node operating in the communications system of encrypted traffic. The traffic is routed between two or more endpoints via the communications system. The traffic is encrypted between the two or more endpoints. The one or more indications indicate a respective protocol to be used with the one or more keys to enable decryption of the encrypted traffic. The first node then initiates sending the one or more keys and the one or more indications to the third node, thereby enabling decryption of the encrypted traffic. The first node and the third node are different from any of the two or more endpoints.

According to a second aspect of embodiments herein, the object is achieved by a computer-implemented method, performed by a third node. The method is for handling encrypted traffic in the communications system. The third node operates in the communications system. The third node receives, from the first node operating in the communications system: the one or more keys to enable decryption of traffic routed between two or more endpoints via the communications system. The traffic is encrypted between the two or more endpoints. The third node also receives the one or more indications indicating the respective protocol to be used with the one or more keys to enable decryption of the encrypted traffic. The third node further receives the one or more second indications indicating the session between the two or more endpoints for which decryption with the one or more keys is applicable. The third node also decrypts the traffic for the indicated session with the received one or more keys, according to the respective protocol, to perform a management operation on the traffic. The first node and the third node are different from any of the two or more endpoints.

According to a third aspect of embodiments herein, the object is achieved by a computer-implemented method, performed by a second node. The method is for handling encrypted traffic in the communications system. The second node operates in the communications system. The second node initiates providing, to the first node operating in the communications system, the one or more keys and the one or more indications. The one or more keys enable decryption of traffic routed between two or more endpoints via the communications system. The traffic is encrypted between the two or more endpoints. The first node is different from any of the two or more endpoints, and the one or more indications indicating the respective protocol to be used with the one or more keys to enable decryption of the encrypted traffic.

According to a fourth aspect of embodiments herein, the object is achieved by a computer-implemented method, performed by a communications system. The method is for handling encrypted traffic in the communications system. The method comprises initiating providing, by the second node operating in the communications system, to the first node operating in the communications system, the one or more keys and the one or more indications. The one or more keys enable decryption of traffic routed between two or more endpoints via the communications system. The traffic is encrypted between the two or more endpoints. The first node is different from any of the two or more endpoints. The one or more indications indicate the respective protocol to be used with the one or more keys to enable decryption of the encrypted traffic. The method also comprises receiving, by the first node, directly, or indirectly, from the second node: the one or more keys, and the one or more indications. The method further comprises initiating sending, by the first node, the one or more keys and the one or more indications to the third node operating in the communications system, thereby enabling decryption of the encrypted traffic. The first node and the third node are different from any of the two or more endpoints. The method further comprises receiving, by the third node, from the first node: a) the one or more keys, b) the one or more indications, and c) the one or more second indications indicating the session between the two or more endpoints for which decryption with the one or more keys is applicable. The method further comprises decrypting, by the third node, the traffic for the indicated session with the received one or more keys, according to the respective protocol, to perform the management operation on the traffic.

According to a fifth aspect of embodiments herein, the object is achieved by the first node, for handling encrypted traffic in the communications system. The first node is configured to operate in the communications system. The first node is further configured to receive, directly, or indirectly, from the second node configured to operate in the communications system the one or more keys and the one or more indications. The one or more keys are configured to enable decryption, by the third node configured to operate in the communications system, of encrypted traffic. The traffic is configured to be routed between two or more endpoints via the communications system. The traffic is configured to be encrypted between the two or more endpoints. The one or more indications are configured to indicate the respective protocol to be used with the one or more keys to enable decryption of the encrypted traffic. The first node is also configured to initiate sending the one or more keys and the one or more indications to the third node, thereby enabling decryption of the encrypted traffic. The first node and the third node are configured to be different from any of the two or more endpoints.

According to a sixth aspect of embodiments herein, the object is achieved by the third node, for handling encrypted traffic in the communications system. The third node is configured to operate in the communications system. The third node is further configured to receive, from the first node configured to operate in the communications network, the one or more keys, the one or more indications, and the one or more second indications. The one or more keys is configured to enable decryption of traffic configured to be routed between two or more endpoints via the communications system. The traffic is configured to be encrypted between the two or more endpoints. The one or more indications are configured to indicate the respective protocol configured to be used with the one or more keys to enable decryption of the encrypted traffic. The one or more second indications are configured to indicate the session between the two or more endpoints for which decryption with the one or more keys is configured to be applicable. The third node is further configured to decrypt the traffic for the session configured to be indicated with the one or more keys configured to be received, according to the respective protocol, to perform the management operation on the traffic. The first node and the third node are configured to be different from any of the two or more endpoints.

According to a seventh aspect of embodiments herein, the object is achieved by the second node, for handling encrypted traffic in the communications system. The second node is configured to operate in the communications system. The second node is further configured to initiate providing, to the first node configured to operate in the communications system, the one or more keys and the one or more indications. The one or more keys are configured to enable decryption of traffic configured to be routed between two or more endpoints via the communications system. The traffic is configured to be encrypted between the two or more endpoints. The first node is configured to be different from any of the two or more endpoints. The one or more indications are configured to indicate the respective protocol to be used with the one or more keys to enable decryption of the encrypted traffic.

According to an eighth aspect of embodiments herein, the object is achieved by the communications system, for handling encrypted traffic in the communications system. The communications system is configured to initiate providing, by the second node configured to operate in the communications system, to the first node configured to operate in the communications system, the one or more keys and the one or more indications. The one or more keys are configured to enable decryption of traffic configured to be routed between the two or more endpoints via the communications system. The traffic is configured to be encrypted between the two or more endpoints. The first node is configured to be different from any of the two or more endpoints, and the one or more indications are configured to indicate the respective protocol to be used with the one or more keys to enable decryption of the encrypted traffic. The communications system is configured to receive, by the first node, directly, or indirectly, from the second node the one or more keys, and the one or more indications. The communications system is also configured to initiate sending, by the first node, the one or more keys and the one or more indications to the third node, thereby being configured to enable decryption of the encrypted traffic. The first node and the third node are configured to be different from any of the two or more endpoints. The communications system is configured to receive, by the third node, from the first node the one or more keys, the one or more indications, and the one or more second indications configured to indicate the session between the two or more endpoints for which decryption with the one or more keys is configured to be applicable. The communications system is further configured to decrypt, by the third node, the traffic for the session configured to be indicated with the one or more keys configured to be received, according to the respective protocol, to perform the management operation on the traffic.

According to a ninth aspect of embodiments herein, the object is achieved by a computer program, comprising instructions which, when executed on at least one processor, cause the at least one processor to carry out the method performed by the first node.

According to a tenth aspect of embodiments herein, the object is achieved by a computer-readable storage medium, having stored thereon the computer program, comprising instructions which, when executed on at least one processor, cause the at least one processor to carry out the method performed by the first node.

According to an eleventh aspect of embodiments herein, the object is achieved by a computer program, comprising instructions which, when executed on at least one processor, cause the at least one processor to carry out the method performed by the third node.

According to a twelfth aspect of embodiments herein, the object is achieved by a computer-readable storage medium, having stored thereon the computer program, comprising instructions which, when executed on at least one processor, cause the at least one processor to carry out the method performed by third node.

According to a thirteenth aspect of embodiments herein, the object is achieved by a computer program, comprising instructions which, when executed on at least one processor, cause the at least one processor to carry out the method performed by the second node.

According to a fourteenth aspect of embodiments herein, the object is achieved by a computer-readable storage medium, having stored thereon the computer program, comprising instructions which, when executed on at least one processor, cause the at least one processor to carry out the method performed by the second node.

By the first node receiving the one or more keys and the one or more indications from the second node, the first node may be enabled to initiate sending the one or more keys and the one or more indications to the third node, thereby enabling decryption of the encrypted traffic. The first node 111 may therefore enable to provide privacy and security by enabling to use encrypted traffic while at the same time enabling to perform traffic management actions that may require traffic visibility.

By receiving the one or more keys, the third node may be enabled to decrypt the traffic between the at least two endpoints, and thereby be enabled perform the traffic management action, e.g., redirection of the traffic, that may be necessary during the course of operations in the communications system.

By decrypting the traffic between the at least two endpoints, the third node enables to provide, in the communications system, privacy and security by enabling to use encrypted traffic while at the same time enabling to perform traffic management actions that may require traffic visibility.

BRIEF DESCRIPTION OF THE DRAWINGS

Examples of embodiments herein are described in more detail with reference to the accompanying drawings, according to the following description.

DETAILED DESCRIPTION

Certain aspects of the present disclosure and their embodiments address one or more of these challenges identified with the existing methods and provide solutions to the challenges discussed. Embodiments herein may be understood to specifically address this problem when an application may use symmetric traffic encryption, that is, when the transmitter and receiver may use the same secret key to encrypt and decrypt traffic.

Embodiments herein may therefore be understood to relate in general to traffic management with symmetric traffic encryption in 5G networks. Further particularly, embodiments herein may relate to a mechanism, which may be based on an extension of an exposure policy framework, specifically by the content provider, e.g., an AF, to expose one or more secret keys, e.g., for a certain application and for a certain subscriber, to the network operator, e.g., an NEF. This collaborative solution, based on an Service Level Agreement (SLA) between the network operator and the content provider, may allow the network operator to detect the subscriber traffic for a certain application and to apply the corresponding traffic management actions, e.g., redirection, content enrichment, parental control, etc, in a simple and efficient way, especially when the traffic may be encrypted by means of symmetric encryption.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments. All possible combinations are not described to simplify the description.

Figure 1:
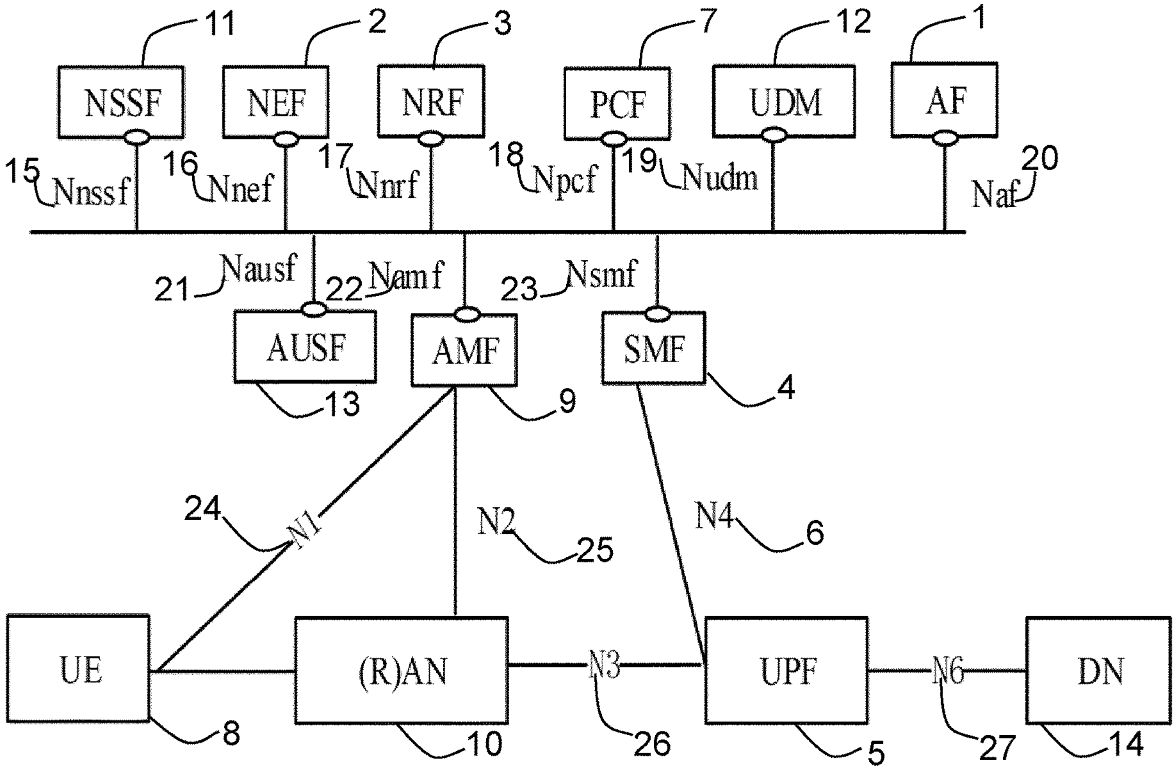
FIG. 1 is a schematic diagram illustrating a non-limiting example of a 5G Network Architecture.
Figure 2:
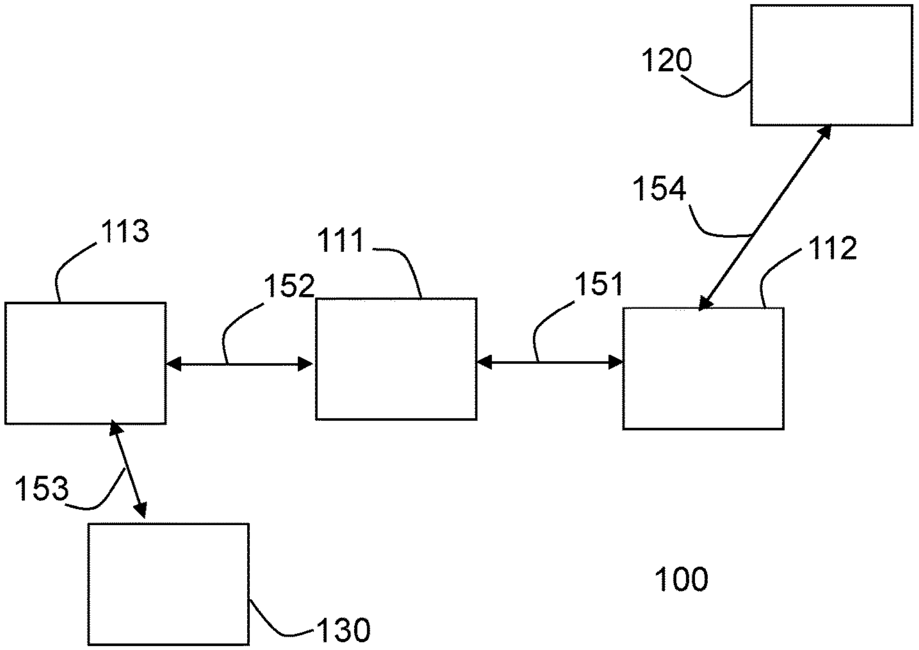
FIG. 2 is a schematic diagram illustrating a non-limiting example of a communications network, according to embodiments herein.
Figure 2:
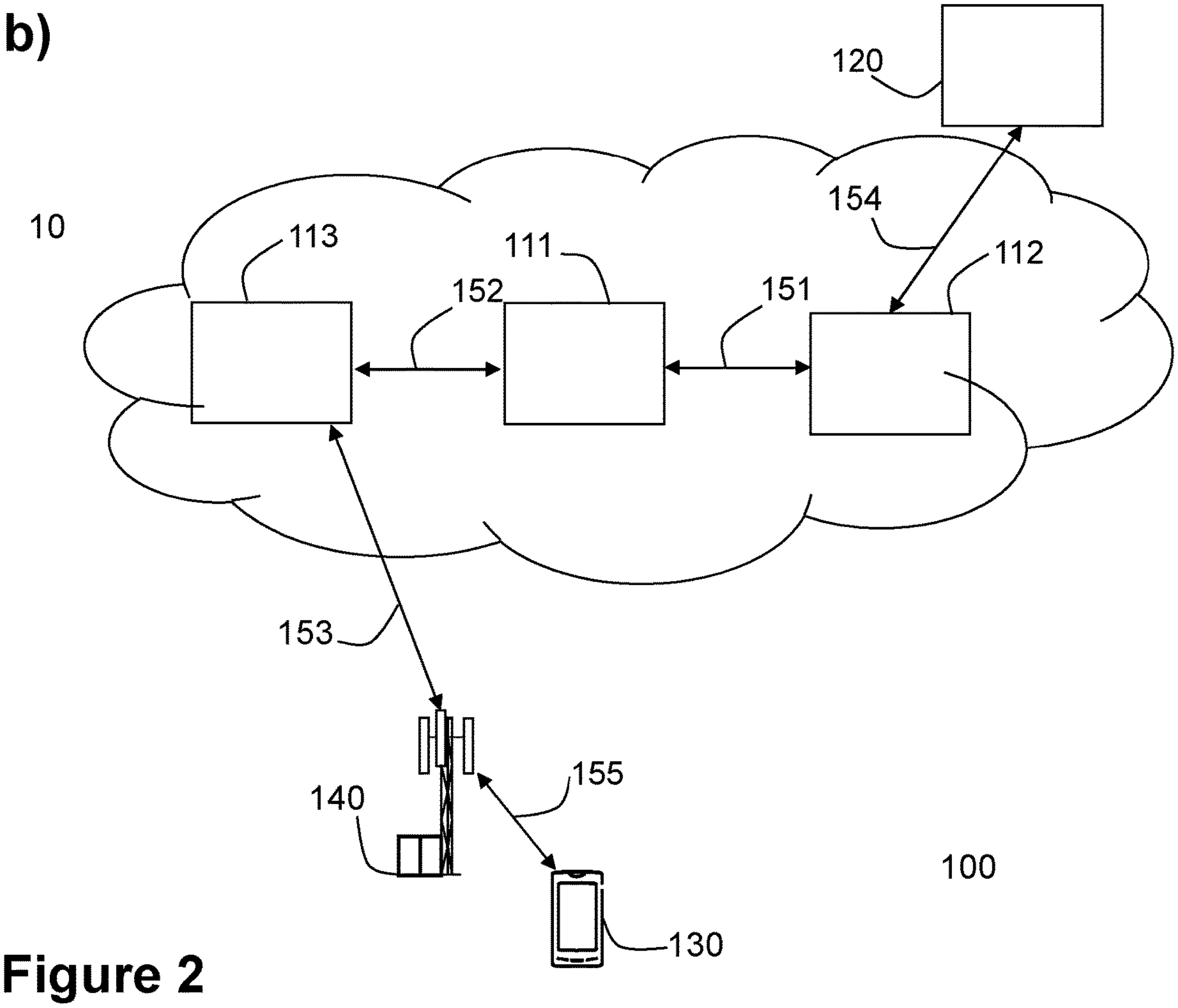

FIG. 2 depicts two non-limiting examples, in panels "a" and "b", respectively, of a communications system 100, in which embodiments herein may be implemented. In some example implementations, such as that depicted in the non-limiting example of FIG. 2*a*, the communications system 100 may be a computer network. In other example implementations, such as that depicted in the non-limiting example of FIG. 2*b*, the communications system 100 may be implemented in a telecommunications system, sometimes also referred to as a telecommunications network, cellular radio system, cellular network or wireless communications system. In some examples, the telecommunications system may comprise network nodes which may serve receiving nodes, such as wireless devices, with serving beams.

In some examples, the telecommunications system may for example be a network such as 5G system, or a newer system supporting similar functionality. The telecommunications system may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications system may for example support a Low Power Wide Area Network (LPWAN). LPWAN technologies may comprise Long Range physical layer protocol (LoRa), Haystack, SigFox, LTE-M, and Narrow-Band IoT (NB-IoT).

Although terminology from Long Term Evolution (LTE)/5G has been used in this disclosure to exemplify the embodiments herein, this should not be seen as limiting the scope of the embodiments herein to only the aforementioned system. Other wireless systems support similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

The communications system 100 may comprise a plurality of nodes, whereof a first node 111, a second node 112, and a third node 113, are depicted in FIG. 2. Any of the first node 111, the second node 112 and the third node 113 may be understood, respectively, as a first computer system, a second computer system, and a third computer system. In some examples, any of the first node 111, the second node 112, and the third node 113 may be implemented as a standalone server in e.g., a host computer in the cloud. Any of the first node 111, the second node 112, and the third node 113 may in some examples be a distributed node or distributed server, with some of their respective functions being implemented locally, e.g., by a client manager, and some of its functions implemented in the cloud, by e.g., a server manager. Yet in other examples, any of the first node 111, the second node 112, and the third node 113 may also be implemented as processing resources in a server farm.

In some embodiments, any of the first node 111, the second node 112, and the third node 113 may be independent and separated nodes. In other embodiments, any of the first node 111, the second node 112 and the third node 113 may be co-located or be the same node. All the possible combinations are not depicted in FIG. 2 to simplify the Figure.

It may be understood that the communications system 100 may comprise more nodes than those represented in FIG. 2. In some examples, the communications system 100 may comprise one or more of a fourth node 114, a fifth node 115, a sixth node 116, a seventh node 117, an eighth node 118, and/or a ninth node 119. Any of the fourth node 114, the fifth node 115, the sixth node 116, the seventh node 117, the eighth node 118, and/or the ninth node 119 may be understood to have a description equivalent to that provided above for the first node 111, the second node 112, or the third node 113.

In some examples of embodiments herein, the first node 111 may be a node having a capability to manage or control policies, such as a PCF in 5G, or a node capable of performing a similar function in the communications system 100. The second node 112 may be a node having a capability to provide content to users of the communications system 100, such as an AF in 5G, or a node or database capable of performing a similar function in the communications system 100. The third node 113 may be a node having a capability to support handling of user plane traffic based on one or more rules such as, for example, packet inspection, e.g., through PDRs, and different enforcement actions, such as traffic steering, QoS, Charging/Reporting, e.g., through FARs, QERs and URRs. The third node 113 may be for example a UPF in 5G, or a node capable of performing a similar function in the communications system 100.

In the examples wherein the communications system 100 may comprise more nodes, the fourth node 114 may be an AMF, or a node capable of performing an equivalent function, the fifth node 115 may be an SMF, or a node capable of performing an equivalent function, the sixth node 116 may be a UDR, or a node capable of performing an equivalent function, the seventh node 117 may be an NRF, or a node capable of performing an equivalent function, the eighth node 118 may be a NEF, or a node capable of performing an equivalent function, and/or the ninth node 119 may be a Top-up server, or a node capable of performing an equivalent function.

The communications system 100 may further comprise at least two endpoints 120, 130, that is, at least a first endpoint 120 and at least a second endpoint 130, between which encrypted communication may be exchanged.

The first endpoint may be, for example, an application server.

The second endpoint 130 may be, for example, a device. The device may be also known as e.g., user equipment (UE), a wireless device, mobile terminal, wireless terminal and/or mobile station, mobile telephone, cellular telephone, or laptop with wireless capability, or a Customer Premises Equipment (CPE), just to mention some further examples. The device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications system 100. The device may be wireless, i.e., it may be enabled to communicate wirelessly in the communications system 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications system 100. In some particular embodiments, the device may be an IoT device, e.g., a NB IoT device.

The communications system 100 may comprise one or more radio network nodes, whereof a radio network node 140 is depicted in FIG. 2*b*. The radio network node 140 may typically be a base station or Transmission Point (TP), or any other network unit capable to serve a wireless device or a machine type node in the communications system 100. The radio network node 140 may be e.g., a 5G gNB, a 4G eNB, or a radio network node in an alternative 5G radio access technology, e.g., fixed or WiFi. The radio network node 140 may be e.g., a Wide Area Base Station, Medium Range Base Station, Local Area Base Station and Home Base Station, based on transmission power and thereby also coverage size. The radio network node 140 may be a stationary relay node or a mobile relay node. The radio network node 140 may support one or several communication technologies, and its name may depend on the technology and terminology used. The radio network node 140 may be directly connected to one or more networks and/or one or more core networks.

The communications system 100 covers a geographical area which may be divided into cell areas, wherein each cell area may be served by a radio network node, although, one radio network node may serve one or several cells.

The first node 111 may communicate with the second node 112 over a first link 151, e.g., a radio link or a wired link. The first node 111 may communicate with the third node 113 over a second link 152, e.g., a radio link or a wired link. The third node 113 may communicate with the second endpoint 130 over a third link 153, e.g., a radio link or a wired link. Any of the one or more first endpoints 120 may communicate with the second node 112 over a respective fourth link 154, e.g., a radio link or a wired link. The radio network node 140 may communicate with the second endpoint 130 over a fifth link 155, e.g., a radio link. Any of the first link 151, the second link 152, the third link 153 the fourth link 154 and the fifth link 155 may be a direct link or it may go via one or more computer systems or one or more core networks in the communications system 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth" and/or "fifth" herein may be understood to be an arbitrary way to denote different elements or entities, and may be understood to not confer a cumulative or chronological character to the nouns these adjectives modify.

Embodiments of a computer-implemented method, performed by the first node 111, will now be described with reference to the flowchart depicted in FIG. 3. The method may be understood to be for handling encrypted traffic in a communications system 100. The first node 111 operates in the communications system 100.

The method may comprise the actions described below. In some embodiments all the actions may be performed. In some embodiments some of the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example or embodiment may be tacitly assumed to be present in another example or embodiment and it will be obvious to a person skilled in the art how those components may be used in the other examples or embodiments.

Figure 3:
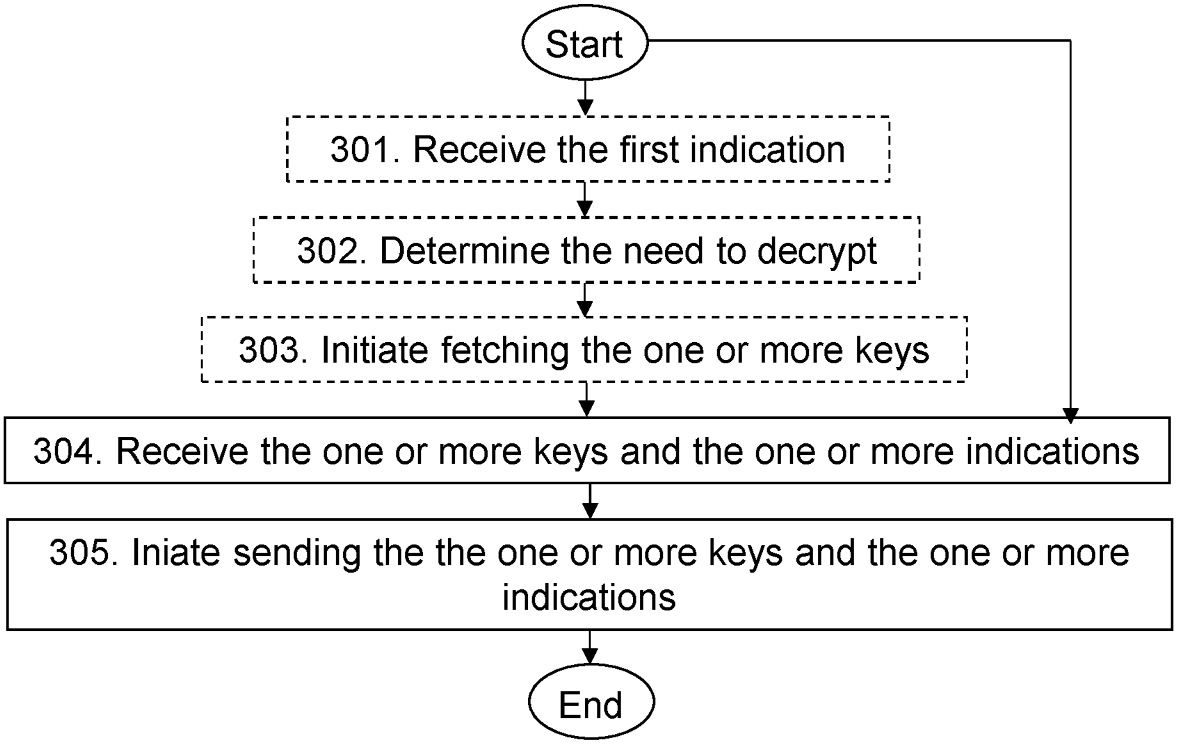
FIG. 3 is a flowchart depicting embodiments of a method in a first node, according to embodiments herein.

In FIG. 3, optional actions are represented with dashed boxes.

Action 301

During the course of operations of the communications system 100, the second endpoint 130, e.g., the device, may initiate usage an application, such as e.g., example.com. In order to do that, the device may contact the fourth node 114, and trigger the establishment of a data session, e.g., a Protocol Data Unit (PDU) session.

As part of the establishment of the data session, the fourth node 114, e.g., an AMF, may need to find out what rules may apply to a user of the second endpoint 130 to manage its data session in the communications system 100. The fourth node 114 may then contact the first node 111, either directly or indirectly, e.g., via the fifth node 115, to obtain the information on which rules may apply to the second endpoint 130. As stated earlier, the first node 111 may be a node having a capability to manage or control policies, such as a PCF in 5G. The first node 111 may then also try to find out which rules may apply to the second endpoint 130 and contact the sixth node 116, e.g., a UDR, to retrieve the policy data for the PDU session of the second endpoint 130.

In this Action 301, the first node 111 may receive a first indication. The first indication may indicate that the second node 112 may have a capability to provide one or more keys to decrypt traffic. The one or more keys are to enable decryption by the third node 113 operating in the communications system 100 of encrypted traffic. The traffic is routed between the two or more endpoints 130, 120 via the communications system 100. The traffic is encrypted between the two or more endpoints 130, 120. The second node 112 may be a node having a capability to provide content to users of the communications system 100, such as an AF in 5G.

The receiving in this Action 301 need not be directly from the second node 112, but via one or more other nodes operating in the communications system 100. For example, the first indication may be a Nudr_Query Response message that may be received from the sixth node 116.

In some embodiments, the first node 111 may be a PCF, the second node 112 may be an AF, and the third node, 113 may be a UPF, or another node operating in the communications system 100.

In some embodiments, the receiving in this Action 301 of the first indication may further comprise receiving one or more second indications indicating a session between the two or more endpoints 130, 120 for which decryption with the one or more keys may be applicable. The session may be the PDU session. For example, the traffic may comprise a plurality of flows. The one or more second indications may indicate, for each flow of the plurality of flows, a respective key, of the one or more keys, that may enable decryption.

The one or more second indications may indicate at least one of the following two options. According to a first option, the one or more second indications may indicate one or more applications for which the second node 112 may support the capability. For example, one application may be indicated by an App-ID, a plurality of applications may be indicated as a list of applications, e.g. a List of App-ID, to which the second node 112 may be able to provide the event, comprising for example the identifiers of the respective applications, e.g., App-IDs, such as example.com.

According to a second option, the one or more second indications may indicate at least one of the two or more endpoints 130, 120. Examples of this kind of indications may be an indication of the users, e.g., as a List of users, to which the second node 112 may be able to provide the event which may comprise e.g., the UE-ID or the list of UE-ID, a UE-Group-ID or list of UE-Group-ID, AnyUE. Inclusion of this parameter may be optional. By default, it may be set to AnyUE.

In the particular non-limiting example wherein the first indication may be the Nudr_Query Response message, the first indication may comprise a subscriber profile, indicating a user of the second endpoint 130. The subscriber profile may specifically include a support of the capability. The capability may be indicated as a new event for the second node 112, e.g., an AF Event-ID=SecretKey for a certain application, which may be identified by an application identifier, an App-ID, such as example.com.

In some embodiments, the first indication may be received for at least one of the two or more endpoints 130 indicated by the first node 111. For example, the first indication may be received from the sixth node 116 in response to a query, e.g., a Nudr_Query Request, sent by the first node 111, which may have identified the user of the second endpoint 130, e.g., by including its UE-ID.

By receiving the first indication in this Action 301, the first node 111 may be enabled to know that in the event that the first node 111 may detect that traffic may need to be decrypted, for example, by detecting that one or more criteria have been meet to perform some traffic management action, such as redirecting traffic, the first node 111 may request the one or more keys that may be needed to decrypt the traffic from the second node 112.

Action 302

In some embodiments, the first node 111, in this Action 302, may determine a need to decrypt the traffic.

Determining may be understood as e.g., calculating, deciding or detecting.

The first node 111 may determine the need to decrypt the traffic by controlling, e.g., when prompted by another node operating in the communications system 100, one or more policies for the established session for the second endpoint 130. The one or more policies may comprise the one or more criteria mentioned earlier for applying one or more rules, and the first node 111 may control whether the one or more criteria may have been met while the established session may be running. For example, the first node 111 may receive a message from e.g., the fifth node 115, which may report to the first node 111 that a certain volume of traffic has been received and the first node 111 may then detect that the second endpoint 130 has run out of quota for a certain application, e.g., App-ID=example.com, by comparing the received, e.g., accumulative, volume against a threshold, e.g., 1 GB per month.

Accordingly, the determining in this Action 302 may be based on a policy or rule, e.g., a PCC rule. For example, the policy or rule may establish that if a certain quota corresponding to the second endpoint 130 may be exceeded for a certain application, e.g., App-ID=example.com, a certain action to enforce the policy or rule may need to be performed, such as a redirection of the traffic between the second endpoint 130 and the first endpoint 120 to another node to replace the first endpoint 120, such as to the ninth node 119, a top-up server. The enforcement action may, according to the policy or rule, require decryption of the traffic, which may lead the first node 111 to determine the need to decrypt the traffic.

The first node 111 may perform this Action 302, based on a request received from another node operating in the communications system 100. For example, the first node 111 may have been monitoring the one or more criteria based on a Npcf_SMPolicyControl_Create Request message to retrieve Session Management (SM) policies for the established session, e.g., a PDU session, for the second endpoint 130, which may have been received from the fifth node 115, e.g., an SMF.

By determining the need to decrypt the traffic in this Action 302, the first node 111 may then be prompted to initiate fetching the one or more keys, so that the first node 111 may receive them and ultimately send them to the third node 113, so that the third node 113 may be enabled to decrypt traffic between the at least two endpoints 120, 130.

Action 303

In this Action 303, the first node 111 may initiate fetching the one or more keys from the second node 112. The initiating fetching in this Action 303 may be based on the determined need to decrypt in Action 302. That is, the first node 111, may initiate the fetching when it may have determined that there is a need to decrypt the traffic, and may e.g., refrain from fetching the one or more keys otherwise.

The initiating in this Action 303 of the fetching may be based on the received first indication. That is, the first node 111, may initiate the fetching when it may know that the second node 112 may have the capability to provide the one or more keys to decrypt traffic, and may e.g., refrain from fetching the one or more keys otherwise.

Initiating may be understood as triggering, starting, or fetching.

That the first node 111 initiates fetching may be understood to mean that the first node 111 may perform an action which may ultimately lead to the fetching of the one or more keys from the second node 112. That is, the fetching may be implemented via one or more nodes between the first node 111 and the second node 112. For example, the first node 111 may trigger a NEF/AF discovery procedure for an indication of the event, e.g., Event-ID=SecretKey, and for an indication of the application concerned, e.g., for the App-ID=example.com. According to this example, the first node 111 may trigger an AF discovery through the eighth node 118, e.g., a NEF, relative to the Event-ID=SecretKey for an indicated service, that is, the Naf_EventExposure service. In order to do this, the first node 111 may first trigger a Nnrf_NFDiscovery message towards the seventh node 117, e.g., an NRF, in order to know the address of the eighth node 118 which may facilitate fetching the one or more keys from the second node 112 for the application of interest. This may be implemented by including in the message the following parameters: an indication of the network function, e.g., nfType=NEF, an indication of the service, e.g., nfService=Naf_EventExposure, and an indication of the information requested, e.g., nefInfo (Event-Id=SecretKey, App-ID=example.com). Once the seventh node 117 may return the NEF instance to the first node 111, the first node 111 may then trigger a request for the Event-ID=SecretKey for Naf_EventExposure service through the eighth node 118, by sending a Nnef request message towards the eighth node 118. The request message may include one or more of the following parameters: the indication of the service requested, e.g., Naf_EventExposure service, the indication of the event requested, e.g., Event-ID=SecretKey, an indication of a user of the second endpoint 130 the request relates to, e.g., UE-ID, and the indication of the application, e.g., App-ID=example.com.

By initiating fetching the one or more keys in this Action 303, the first node 111 may then be enabled to, after receiving the one or more keys, forward the one or more keys to the third node 113, and thereby enable the third node 113 to decrypt the traffic and perform the management action that the third node 113 may need to perform once it may be enabled to access the traffic.

Action 304

In this Action 304, the first node 111 receives, directly, or indirectly, from the second node 112 operating in the communications system 100, the one or more keys to enable decryption by the third node 113 operating in the communications system 100 of encrypted traffic. As stated earlier, the traffic is routed between the two or more endpoints 130, 120 via the communications system 100. The traffic is encrypted between the two or more endpoints 130, 120. As an example, the one or more keys may be received as the parameter "SecretKey". This SecretKey parameter may identify each of the one or more secret keys that may have been used for symmetric encryption, that is, used both for traffic encryption and decryption, for the encrypted flow within an application concerned, e.g., indicated by App-ID, and for the UE-ID corresponding to the second endpoint 130 as a device.

There may be more than one key received because, as explained before, in some embodiments, the traffic may comprise a plurality of flows, and for each flow of the plurality of flows, there may be a respective key, of the one or more keys, that may enable decryption of the respective flow. It may be understood that each key for each flow may also require a respective protocol to be used with the one or more keys to enable decryption of the encrypted traffic, e.g., in each respective flow.

That the first node 111 receives the one or more keys indirectly from the second node 112 may be understood to mean that the one or more keys may be received via one or more other nodes operating in the communications system 100, such as, for example, the eighth node 118, e.g., a NEF. The eighth node 118 may be that which may have been indicated by the seventh node 117, as described in Action 303.

The first node 111 also receives one or more indications, which may be referred to herein as one or more other indications. That is, one or more indications other than the first indication and the one or more second indications. The one or more indications indicate a respective protocol to be used with the one or more keys to enable decryption of the encrypted traffic. As an example, one of the one or more indications may be received as another parameter "Encryption Protocol Info". This Encryption Protocol Info parameter may comprise information relative to the encrypted flow, e.g., 5-tuple, and the encryption protocol used for the concerned application, e.g., indicated by App-ID, and for the second endpoint 130, e.g., indicated by a UE-ID. The respective protocol may be, e.g. TLS 1.3, QUIC Crypto, etc.

The one or more keys and at least one of the one or more indications, e.g., EncryptionProtocolInfo, may be received, e.g., as another indication of the one or more indications, for example, a list, such as "List of (Secret Key, EncryptionProtocolInfo)". In other words, the one or more keys and the one or more indications may be obtained together as a combined indication, a list of keys and protocol to be used per flow, e.g., as "List of (Secret Key, EncryptionProtocolInfo)" parameter. This combined indication may be referred to herein as a "fourth indication".

It may be understood that the first node 111 may receive the one or more keys and the one or more indications in this Action 304 in response to the first node 111 having initiated the fetching of the one or more keys in Action 303.

By the first node 111 receiving the one or more keys and the one or more indications in this Action 304, the first node 111 may then be enabled to send them to the third node 113, thereby enabling decryption of the encrypted traffic by the third node 113.

Action 305

In this Action 305, the first node 111, initiates sending the one or more keys and the one or more indications to the third node 113, thereby enabling decryption of the encrypted traffic. The first node 111 and the third node 113 are different from any of the two or more endpoints 130, 120.

That the first node 111 initiates sending may be understood to mean that the first node 111 may perform an action which may ultimately lead to the one or more keys and the one or more indications ultimately reaching the third node 113. That is, the sending may be implemented via one or more nodes between the first node 111 and the second node 112.

In some embodiments, the initiating 305 sending the one or more keys and the one or more indications may further comprise initiating sending 305 the one or more second indications indicating the session between the two or more endpoints 130, 120 for which decryption with the one or more keys may be applicable.

For example, in this Action 305, in the example wherein redirection for App-ID=example.com may be necessary, the first node 111 may trigger a Npcf_SMPolicyControl_Update Request message to the fifth node 115, e.g., an SMF, including a PCC rule with the following parameters: App-ID=example.com, Enforcement action=Redirect, the Secret Key, and the EncryptionProtocolInfo.

In some embodiments, at least one of the following options may apply. According to a first option, the traffic may belong to an established session between the two or more endpoints 130, 120, and the one or more keys may be sent and valid during the established session.

According to some embodiments, the traffic may comprise the plurality of flows, and the one or more indications may further indicate, for each flow of the plurality of flows, the respective key, of the one or more keys, that may enable decryption. In some examples, an indication of the one or more indications indicating a correspondence between a flow and the respective key for that flow, may be obtained implicitly, from the respective key, e.g., via a "SecretKey" parameter.

By the first node 111 initiating sending the one or more keys and the one or more indications to the third node 113 in this Action 305, and enabling decryption of the encrypted traffic, the first node 111 may then enable to provide privacy and security by enabling to use encrypted traffic while at the same time enabling to perform traffic management actions that may require traffic visibility.

Figure 4:
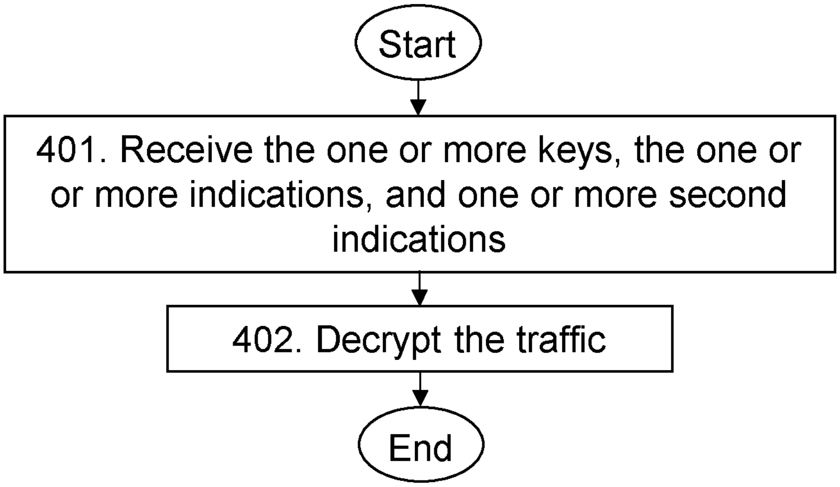
FIG. 4 is a flowchart depicting embodiments of a method in a third node, according to embodiments herein.

Embodiments of a computer-implemented method performed by the third node 113 will now be described with reference to the flowchart depicted in FIG. 4. The method may be understood to be for handling encrypted traffic in the communications system 100. The third node 113 operates in the communications system 100.

The method comprises the following actions. One or more embodiments may be combined, where applicable. All possible combinations are not described to simplify the description. It should be noted that the examples herein are not mutually exclusive. Components from one example or embodiment may be tacitly assumed to be present in another example or embodiment, and it will be obvious to a person skilled in the art how those components may be used in the other examples.

The detailed description of some of the following corresponds to the same references provided above, in relation to the actions described for the first node 111 and will thus not be repeated here to simplify the description. For example, the first node 111 may be a PCF, the second node 112 may be an AF, and the third node 113 may be a UPF.

Action 401

In this Action 401, the third node 113 receives, from the first node 111 operating in the communications system 100 the one or more keys to enable decryption of the traffic routed between the two or more endpoints 130, 120 via the communications system 100. The traffic is encrypted between the two or more endpoints 130, 120. The third node 113 also receives the one or more indications indicating the respective protocol to be used with the one or more keys to enable decryption of the encrypted traffic. The third node 113 further receives the one or more second indications indicating the session between the two or more endpoints 130, 120 for which decryption with the one or more keys is applicable.

The receiving in this Action 401 may be indirect. For example, the one or more keys and the one or more indications may be received from the first node 111 via the fifth node 115, e.g., an SMF.

The receiving may be e.g., in a PFCP Session Modification Request.

In some embodiments, at least one of the following options may apply. According to a first option, the traffic belongs to the session, established between the two or more endpoints 130, 120, and the one or more keys may be received and valid during the established session.

According to a second option, the traffic may comprise a plurality of flows, and the one or more indications may further indicate, for each flow of the plurality of flows, the respective key, of the one or more keys, that may enable decryption.

The one or more second indications may indicate at least one of the following two options. According to a first option, the one or more second indications may indicate the one or more applications for which decryption with the one or more keys may be applicable. For example, one application may be indicated by an App-ID, a plurality of applications may be indicated as a list of applications, e.g. a List of App-ID, to which the second node 112 may be able to provide the event, comprising for example the identifiers of the respective applications, e.g., App-IDs, such as example.com.

According to a second option, the one or more second indications may indicate at least one of the two or more endpoints 130, 120. Examples of this kind of indications may be an indication of the users, e.g., as a List of users, to which the second node 112 may be able to provide the event which may comprise e.g., the UE-ID or the list of UE-ID, a UE-Group-ID or list of UE-Group-ID, AnyUE. Inclusion of this parameter may be optional. By default, it may be set to AnyUE.

In a particular example, the one or more keys and the one or more indications may be received in a PFCP Session Modification Request message including the following parameters: an indication of the policy detection rule that may be concerned, e.g., PDR, an indication of the application concerned e.g., App-ID=example.com, an indication of the FAR concerned, e.g., Redirect action, the first indication, e.g., as Secret Key, and an indication of the respective protocol as e.g., EncryptionProtocolInfo.

By receiving the one or more keys in this Action 401, the third node 113 may be enabled to decrypt the traffic between the at least two endpoints 120, 130, and thereby be enabled perform the traffic management action, e.g., redirection of the traffic, that may be necessary.

Action 402

In this Action 402, the third node 113 decrypts the traffic for the indicated session with the received one or more keys, according to the respective protocol, to perform a management operation on the traffic. The first node 111 and the third node 113 are different from any of the two or more endpoints 130, 120.

The management operation on the traffic may be redirection of traffic, HTTP header enrichment, etc.

By decrypting the traffic between the at least two endpoints 120, 130, the third node 113 enables to provide, in the communications system 100, privacy and security by enabling to use encrypted traffic while at the same time enabling to perform traffic management actions that may require traffic visibility.

Figure 5:
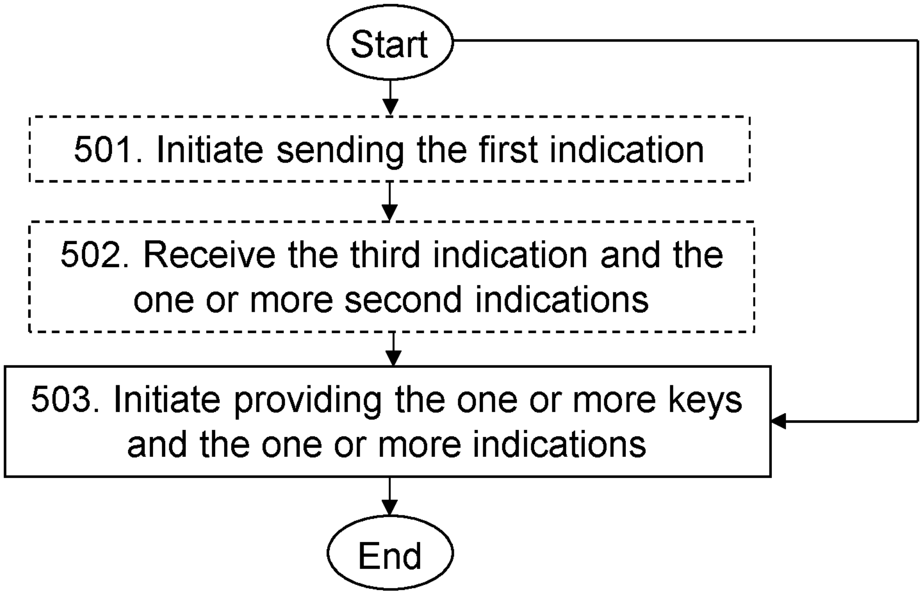
FIG. 5 is a flowchart depicting embodiments of a method in a second node, according to embodiments herein.

Embodiments of a computer-implemented method performed by the second node 112, will now be described with reference to the flowchart depicted in FIG. 5. The method may be understood to be for handling encrypted traffic in the communications system 100. The second node 112 operates in the communications system 100.

The method may comprise one or more of the following actions. Several embodiments are comprised herein. In some embodiments, the method may comprise one action. In other embodiments, the method may comprise two or more actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are depicted with dashed lines.

The detailed description of some of the following corresponds to the same references provided above, in relation to the actions described for the first node 111 and will thus not be repeated here to simplify the description. For example, the first node 111 may be a PCF, and the second node 112 may be an AF.

Action 501

In this Action 501, the second node 112 may initiate sending the first indication to the first node 111. The first indication may indicate that the second node 112 has the capability to provide the one or more keys to decrypt the traffic.

That the second node 112 may initiate sending the first indication to the first node 111 may be understood to mean that the second node 112 may send the first indication towards the first node 111, that is, not directly, via one or more other nodes, such as for example, the eighth node 118, e.g., a NEF of the network operator. In other words, the second node 112 may initiate sending the first indication to the first node 111 by sending the first indication towards the first node 111, which may ultimately be received by the first node 111.

In some embodiments, the initiating sending of the first indication in this Action 501 may further comprise initiating sending the one or more second indications indicating the session between the two or more endpoints 130, 120 for which decryption with the one or more keys may be applicable.

The one or more second indications may indicate at least one of the following two options. According to a first option, the one or more second indications may indicate the one or more applications for which the second node 112 may support decryption. According to a second option, the one or more second indications may indicate at least one of the two or more endpoints 130, 120.

In a particular non-limiting example, the second node 112, the content provider, according to this Action 501, may trigger an onboarding procedure into the eighth node 118, by sending the first indication indicating the support of the new event described earlier, which may be indicated as Event-ID=SecretKey, as part of a Naf_EventExposure service. The second node 112 may trigger the onboarding procedure by sending an onboarding request message. The onboarding request message may further include, in addition to an indication of the event supported by the second node 112, e.g., Event-ID=SecretKey, which may indicate the event supported by the second node 112, the one or more second indications. The one or more second indications may be indicated as one or more of the following parameters: a) an indication of the content provider, that is, the second node 112, e.g., an AF; the indication may be e.g., an AF-ID, b) an indication of the service supported by the second node 112, e.g., Service=Naf_EventExposure, c) the indication of the applications to which the second node 112 may provide the event; this indication may be provided as a list, e.g., List of App-ID, which may identify the individual applications with the respective identifiers of the applications, for example, App-IDs, such as example.com, and d) the indication of the users to which the second node 112 may be able to provide the event; this indication may be provided as a list, e.g., List of users, which may identify the individual users with the respective identifiers of the users, for example, e.g., the UE-ID or list of UE-ID, UE-Group-ID or list of UE-Group-ID, AnyUE. This parameter may be understood to be optional. By default it may be set to AnyUE.

By initiating sending the first indication in this Action 501, the second node 112 may advertise its capability to be able to provide the one or more keys to another node in the communications system 100, such as the first node 111, and thereby ultimately enable decryption of the traffic between the one or more endpoints 120, 130. The specific benefits of this Action 501 may be understood to correspond to those already described for Action 305.

Action 502

In this Action 502, the second node 112 may receive a third indication to provide the one or more keys to the first node 111. The second node 112 may also receive the one or more second indications of the session between the two or more endpoints 130, 120 for which decryption is to be enabled.

The third indication may be received from another node in the communications system 100, different than the first node 111, for example, from the eighth node 118, a NEF.

For example, the third indication may be, or may be comprised in, a Naf request message, received from the eighth node 118, triggering a request to the Event-ID=SecretKey for the Naf_EventExposure service. The request message may include one or more of the following parameters: Naf_EventExposure service, Event-ID=SecretKey, UE-ID and App-ID=example.com.

In some embodiments, the received third indication may be based on the sent first indication. That is, the request to provide the one or more keys to the first node 111 may be based on the second node 112 having previously advertised in Action 501 that it may be able to provide the one or more keys.

Action 503

In this Action 503, the second node 112 initiates providing, to the first node 111 operating in the communications system 100, the one or more keys and the one or more indications. The one or more keys enable decryption of the traffic routed between two or more endpoints 130, 120 via the communications system 100. The traffic is encrypted between the two or more endpoints 130, 120. The first node 111 is different from any of the two or more endpoints 130, 120. The one or more indications indicate the respective protocol to be used with the one or more keys to enable decryption of the encrypted traffic.

That the second node 112 may initiate providing the one or more keys and the one or more indications to the first node 111 may be understood to mean that the second node 112 may send the one or more keys and the one or more indications towards the first node 111, that is, not directly, via one or more other nodes, such as for example, the eighth node 118, e.g., a NEF of the network operator. In other words, the second node 112 may initiate sending the one or more keys and the one or more indications to the first node 111 by sending the one or more keys and the one or more indications towards the first node 111.

In some embodiments, the initiating providing in this Action 503 may be based on the received third indication and one or more second indications.

In some embodiments, at least one of the following may apply. In some embodiments, the traffic may belong to the established session between the two or more endpoints 130, 120, and the one or more keys may be sent and valid during the established session. In some embodiments, the traffic may comprise the plurality of flows, and the one or more indications may further indicate, for each flow of the plurality of flows, the respective key, of the one or more keys, that may enable decryption.

As described earlier, the one or more keys and the one or more indications may be obtained together as a combined indication, a list of keys and protocol to be used per flow, e.g., as "List of (Secret Key, EncryptionProtocolInfo)" parameter, also referred to herein as the "fourth indication". In a particular example, the one or more keys may be each indicated by a "SecretKey" parameter, which may identify the secret key used for symmetric encryption, that is, used both for traffic encryption and decryption, e.g., for the encrypted flow within App-ID and for the UE-ID. The one or more indications may be one or more "EncryptionProtocolInfo", which may each include information relative to the encrypted flow, e.g., 5-tuple, and the encryption protocol used for the App-ID and for the UE-ID, e.g. TLS 1.3, QUIC Crypto, etc.

In some examples, an indication of the one or more indications indicating a correspondence between a flow and the respective key for that flow, may be obtained implicitly, from the respective key, e.g., via a "SecretKey" parameter.

The advantages of this Action 503 may be understood to correspond to those described for Action 304.

Embodiments of a computer-implemented method, performed by the communications system 100, will now be described with reference to the flowchart depicted in FIG. 6. The method may be understood to be for handling encrypted traffic in the communications system 100.

The method may comprise the actions described below. In some embodiments some of the actions may be performed. In some embodiments all the actions may be performed. In FIG. 6, optional actions are indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Figure 6:
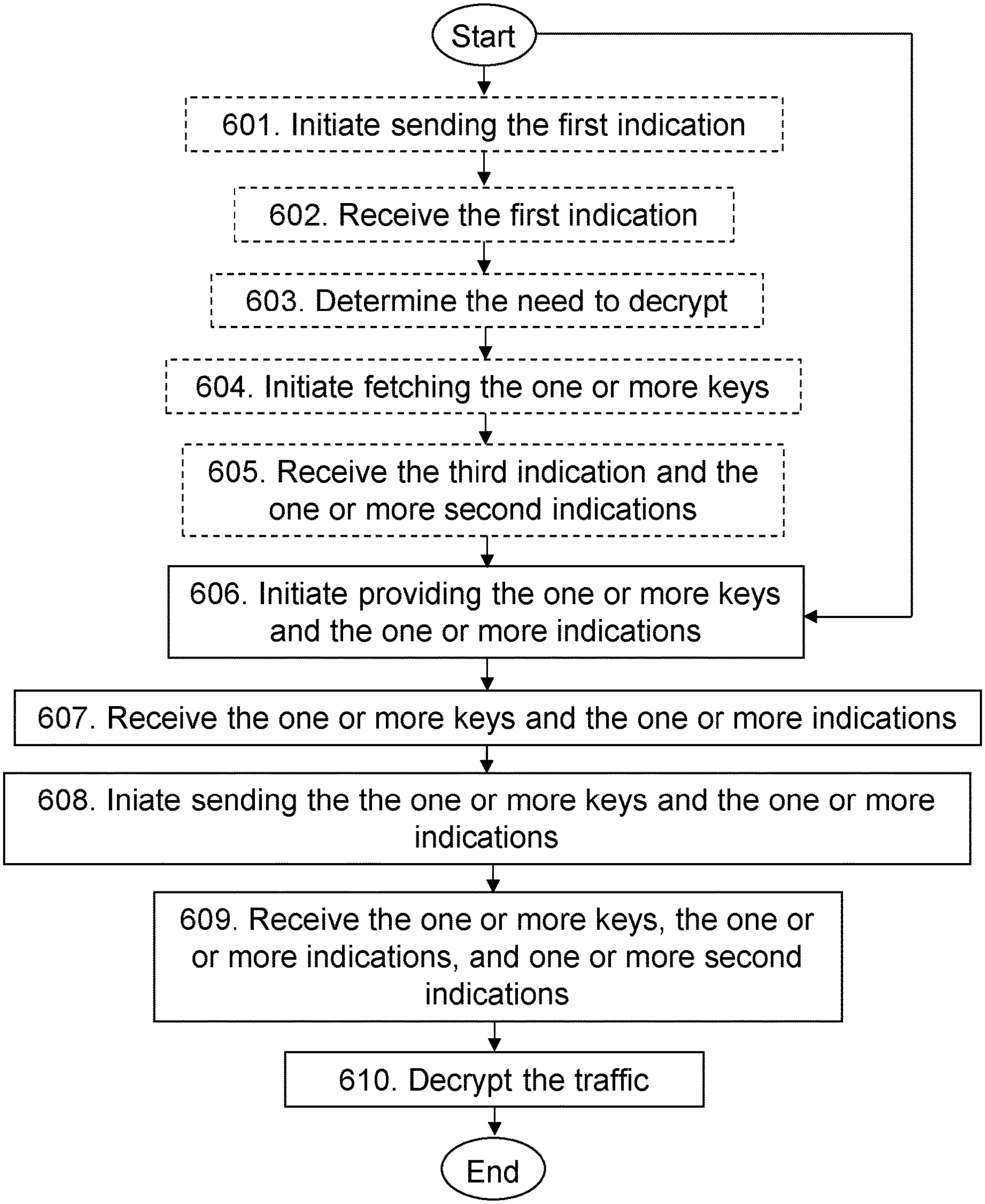
FIG. 6 is a flowchart depicting embodiments of a method in a communications system, according to embodiments herein.

The detailed description of the Actions depicted in FIG. 6 may be understood to correspond to that already provided when describing the actions performed by each of the first node 111, the second node 112, and the third node 113, and will therefore not be repeated here. Any of the details and/or embodiments already described earlier may be understood to equally apply to the description below.

Action 601

This Action 601, which corresponds to Action 501, comprises, initiating 601, by the second node 112, the first indication to the first node 111. The first indication may indicate that the second node 112 may have the capability to provide the one or more keys to decrypt the traffic.

Action 602

This Action 602, which corresponds to Action 301, comprises, receiving, by the first node 111, the first indication indicating that the second node 112 may have the capability to provide the one or more keys to decrypt the traffic.

Action 603

In some embodiments, this Action 603, which corresponds to Action 302, comprises determining, by the first node 111, the need to decrypt the traffic.

Action 604

In some embodiments, this Action 604, which corresponds to Action 303, may comprise, initiating, by the first node 111, fetching the one or more keys from the second node 112. The initiating fetching in this Action 604, 303 may be based on the determined need to decrypt.

The initiating in this Action 604, 303 of the fetching, may be based on the received first indication.

Action 605

In some embodiments, in this Action 605, which corresponds to Action 502, may comprise, receiving, by the second node 112, a) the third indication to provide the one or more keys to the first node 111, and b) the one or more second indications of the session between the two or more endpoints 130, 120 for which decryption is to be enabled. The received third indication may be based on the sent first indication.

Action 606

This Action 606, which corresponds to Action 503, comprises, initiating providing, by the second node 112 operating in the communications system 100, to the first node 111 operating in the communications system 100, the one or more keys and the one or more indications. The one or more keys enable decryption of the traffic routed between two or more endpoints 130, 120 via the communications system 100. The traffic is encrypted between the two or more endpoints 130, 120. The first node 111 is different from any of the two or more endpoints 130, 120. The one or more indications indicate the respective protocol to be used with the one or more keys to enable decryption of the encrypted traffic.

The initiating 606, 503 providing may be based on the received third indication and one or more second indications.

Action 607

In some embodiments, the method comprises, in this Action 607, which corresponds to Action 304, receiving by the first node 111, directly, or indirectly, from the second node 112: i) the one or more keys, and ii) the one or more indications.

Action 608

This Action 608, which corresponds to Action 305, comprises, initiating sending, by the first node 111, the one or more keys and the one or more indications to the third node 113 operating in the communications system 100, thereby enabling decryption of the encrypted traffic. The first node 111 and the third node 113 are different from any of the two or more endpoints 130, 120.

Action 609

In some embodiments, the method may comprise, in this Action 609, which corresponds to Action 401, receiving, by the third node 113, from the first node 111: a) the one or more keys, b) the one or more indications, and c) the one or more second indications indicating the session between the two or more endpoints 130, 120 for which decryption with the one or more keys is applicable.

Action 610

This Action 610, which corresponds to Action 402, comprises decrypting, by the third node 113, the traffic for the indicated session with the received one or more keys, according to the respective protocol, to perform a management operation on the traffic.

The methods described herein may be understood to be based on an extension of the exposure policy framework, specifically by the content provider, that is, the second node 112, e.g., an AF, to expose the secret key, e.g., for a certain application and for a certain subscriber, to the network operator, via e.g., the eighth node 118, e.g., an NEF. This collaborative solution, which may be based on an SLA agreement between the network operator and the content provider, may be understood to allow the network operator to detect the subscriber traffic for a certain application and to apply the corresponding traffic management actions, such as redirection, content enrichment, parental control, etc, in a simple and efficient way, especially when the traffic may be encrypted by means of symmetric encryption. The methods just described as being implemented by the first node 111, the second node 112 and the third node 113 will now be described in further detail with two specific non-limiting examples of traffic management action in the next two figures. Two different use cases are shown below: HTTP Redirection, depicted in FIGS. 7-12, and HTTP Header Enrichment, depicted in FIGS. 13-14. It may be understood that these are just two example use cases, as the proposed methods may be understood to allow support for other traffic management actions, and may also allow to detect encrypted application traffic.

Figure 7:
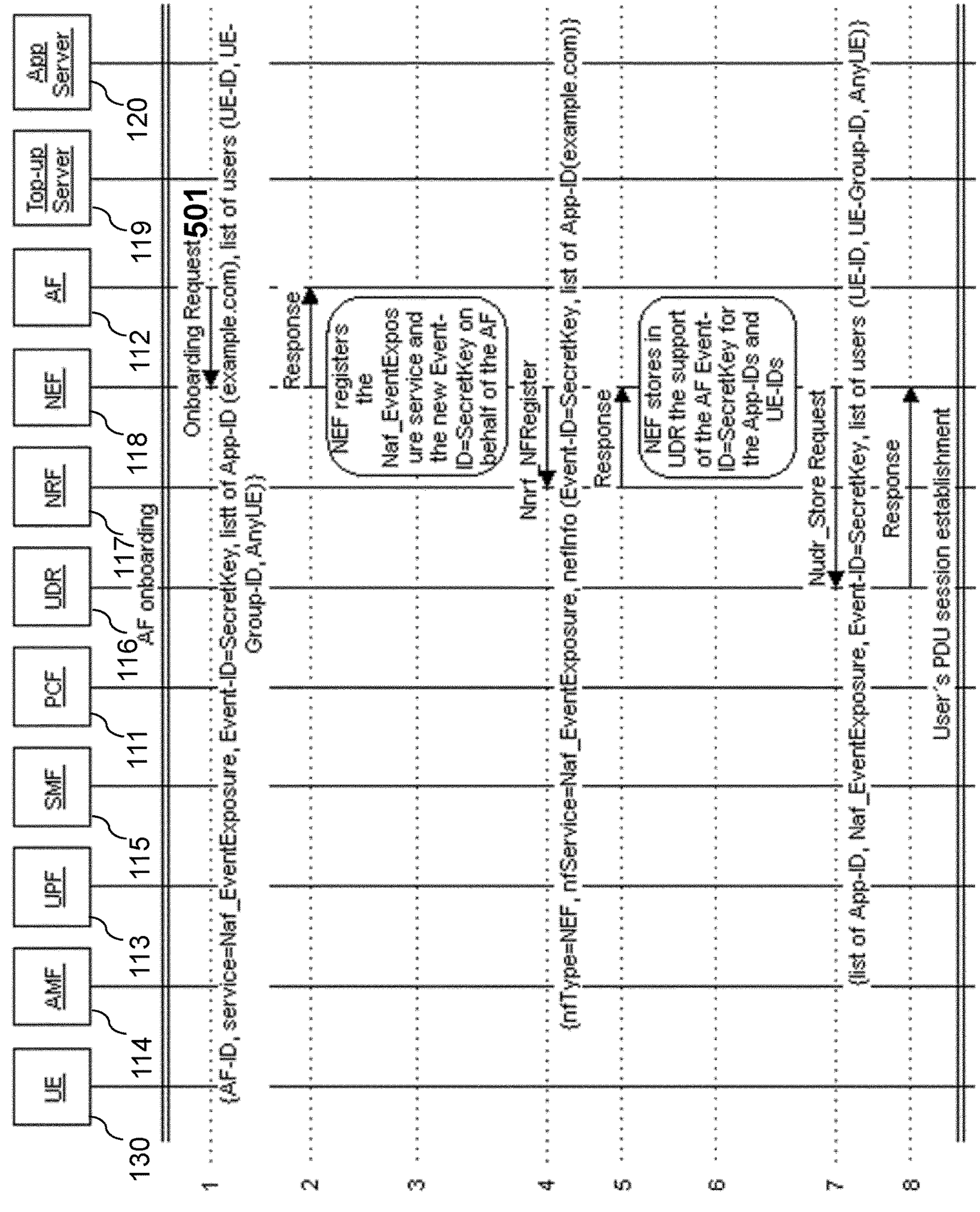
FIG. 7 is a schematic diagram depicting a non-limiting example of signalling between nodes in a communications system, according to embodiments herein.

FIG. 7 is a signalling diagram depicting a first non-limiting example of embodiments herein illustrating an HTTP Redirection use case. Particularly, the sequence diagram shown in FIG. 7 shows an example of traffic redirection triggered when the quota for a certain application, e.g., example.com, has been consumed and when the application is based on HTTPS/TLS or QUIC transport. The steps of this example are detailed below. In this non-limiting example, the first node 111 is a PCF, the second node 112 is an AF, the third node 113 is an UPF, the first endpoint 120 is an Application Server (App Server) and the second endpoint 130 is a UE. In this example, in step 1, the second node 112, the content provider, according to Action 501, triggers an onboarding procedure into the eighth node 118, here a network operator's NEF, by sending the first indication indicating the support of a new event, indicated as Event-ID=SecretKey, as part of a Naf_EventExposure service, by sending an onboarding request message. The onboarding request message here includes the following parameters: a) AF-ID, which identifies the content provider, that is, the second node 112, e.g., an AF, b) Service=Naf_EventExposure, which indicates the service supported by the second node 112, c) Event-ID=SecretKey, which indicates the event supported by the second node 112, d) List of App-ID, which determines the App-IDs to which the second node 112 may provide the event, e.g., example.com, and e) List of users, which indicates the users to which the second node 112 may be able to provide the event, e.g., the UE-ID or list of UE-ID, UE-Group-ID or list of UE-Group-ID, AnyUE. This parameter is optional. By default it may be set to AnyUE. At step 2, the eighth node 118 acknowledges the onboarding request from the second node 112. At steps 3 and 4, eighth node 118 registers the Event-ID=SecretKey as part of the Naf_EventExposure service in the seventh node 117, an NRF, on behalf of the second node 112. In order to do this, the eighth node 118 triggers a Nnrf_NFRegister message towards the seventh node 117 including the following parameters: nfType=NEF, and nfService=Naf_EventExposure, nefInfo (Event-ID=SecretKey, list of App-ID(example.com)). In case the second node 112, is trusted, the second node 112 may directly register the Event-ID=SecretKey as part of the Naf_EventExposure service in the seventh node 117. At step 5, the seventh node 117 acknowledges the Nnrf_NFRegister message from the eighth node 118. At steps 6 and 7, the eighth node 118 stores in the sixth node 116, e.g., a UDR, support for the new event, that is, Event-ID=SecretKey, for the App-ID/s and user/s indicated above. This may be stored either as application data, e.g., for the App-ID/s, or as part of the subscriber profile, e.g., for the UE-ID/s. In order to do this, it is proposed that the eighth node 118 triggers a Nudr_Store Request message including the following parameters: list of App-ID, Naf_EventExposure, Event-ID=SecretKey, list of users, e.g., UE-ID, UE-Group-ID, AnyUE. At step 8, the sixth node 116 acknowledges the Nnrf_NFRegister message from the eighth node 118.

Figure 8:
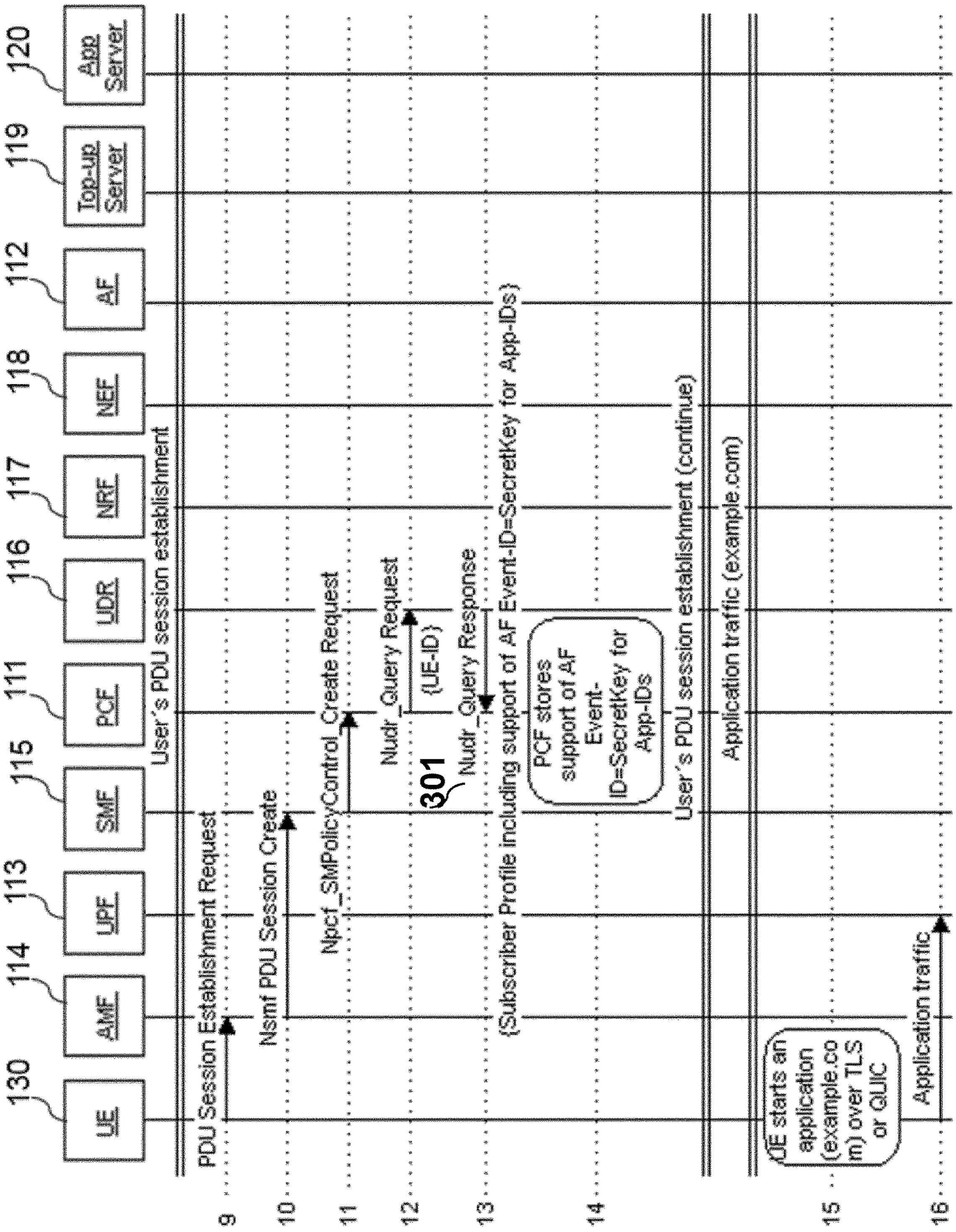
FIG. 8 is a schematic diagram depicting a continuation of FIG. 7.

FIG. 8 is a continuation of the procedure depicted in FIG. 7. At step 9, the second endpoint 130, a UE, triggers a PDU session establishment, by means of sending a PDU Session Establishment Request to the fourth node 114, e.g., an AMF. It may be noted that the sequence diagram in FIG. 9 does not include all the signaling messages involved in the PDU Session Establishment procedure. The relevant signaling messages for examples of embodiments herein are described in the subsequent steps. At step 10, the fourth node 114 selects the fifth node 115, e.g., an SMF, to manage the PDU session, and triggers an Nsmf PDU Session Create message. At step 11, the fifth node 115 selects the first node 111 as PCF, and triggers a Npcf_SMPolicyControl_Create Request message to retrieve Session Management (SM) policies for the user PDU session. At step 12, the first node 111 triggers a Nudr_Query Request message to retrieve the policy data for the PDU session of this second endpoint 130, that is, e.g., the user of the UE. At step 13, the sixth node 116, a UDR, answers with a Nudr_Query Response message including the Subscriber Profile, and specifically including the first indication indicating support of the AF Event-ID=SecretKey for the App-ID for example.com. The message is received by the first node 111 in accordance with Action 301. At step 14, the first node 111 stores the support of the AF Event-ID=SecretKey for the App-ID of example.com. After these steps, the establishment of the PDU session for the user of the second endpoint 130 may continue. At steps 15 and 16, the second endpoint 130 may start the application, here example.com, over TLS or QUIC.

Figure 9:
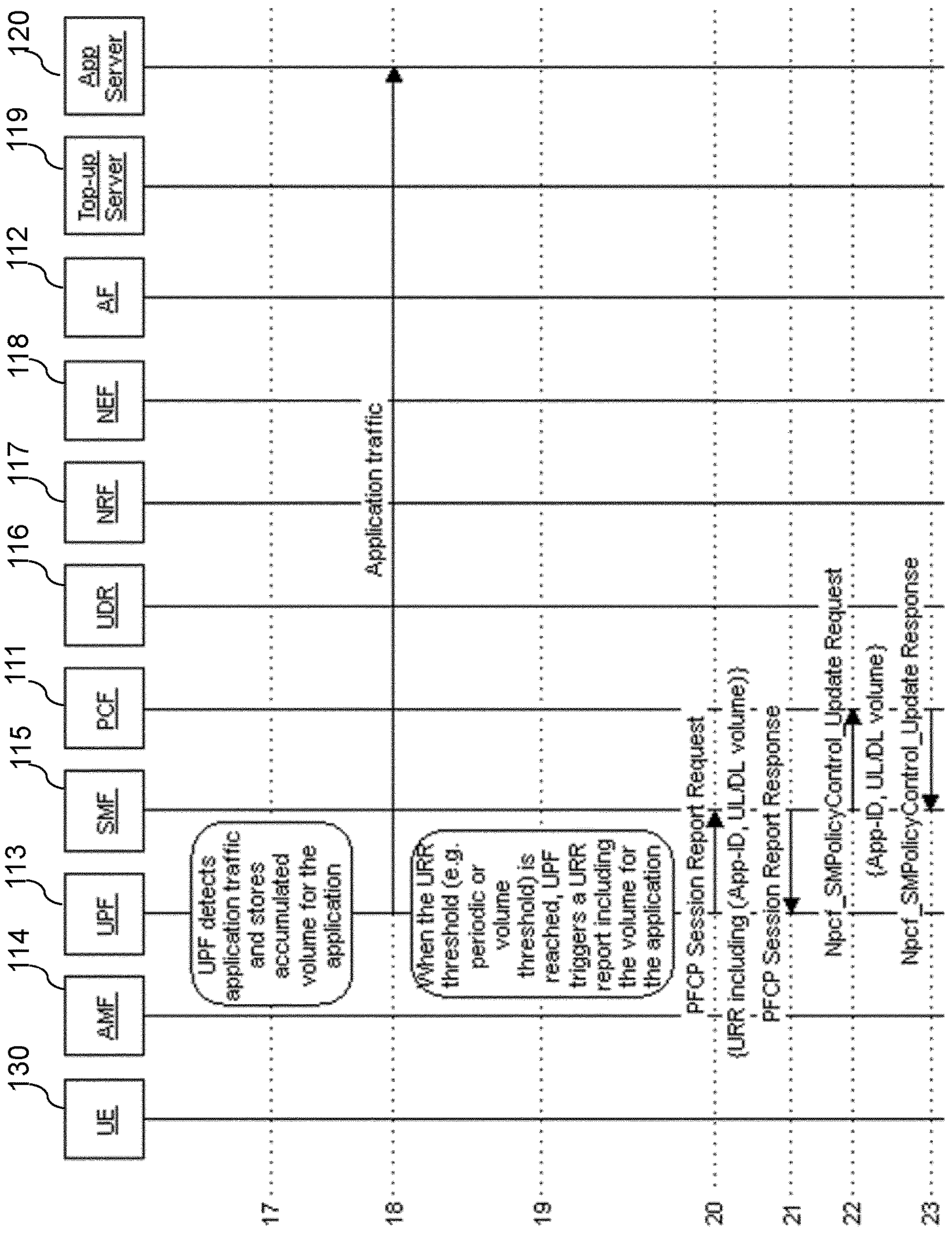
FIG. 9 is a schematic diagram depicting a continuation of FIG. 8.

FIG. 9 is a continuation of the procedure depicted in FIG. 8. At steps 17 and 18, the third node 113, e.g., a UPF, detects application traffic by matching an Uplink (UL) Packet Detection Rule (PDR) with PDI App-ID=example.com, and stores the accumulated volume for the application. At steps 19 to 21, when the Usage Reporting Rule (URR) threshold, e.g. a periodic or a volume threshold, is reached, the third node 113 triggers a URR report in the PFCP Session Report Request message including the volume for the application. The fifth node 115 answers with a PFCP Session Report Response message. At step 22 and 23, the fifth node 115 reports the application volume to the first node 111 in a Npcf_SMPolicyControl_Update Request message. The first node 111 answers back to the fifth node 115 with a Npcf_SMPolicyControl_Update Response message.

Figure 10:
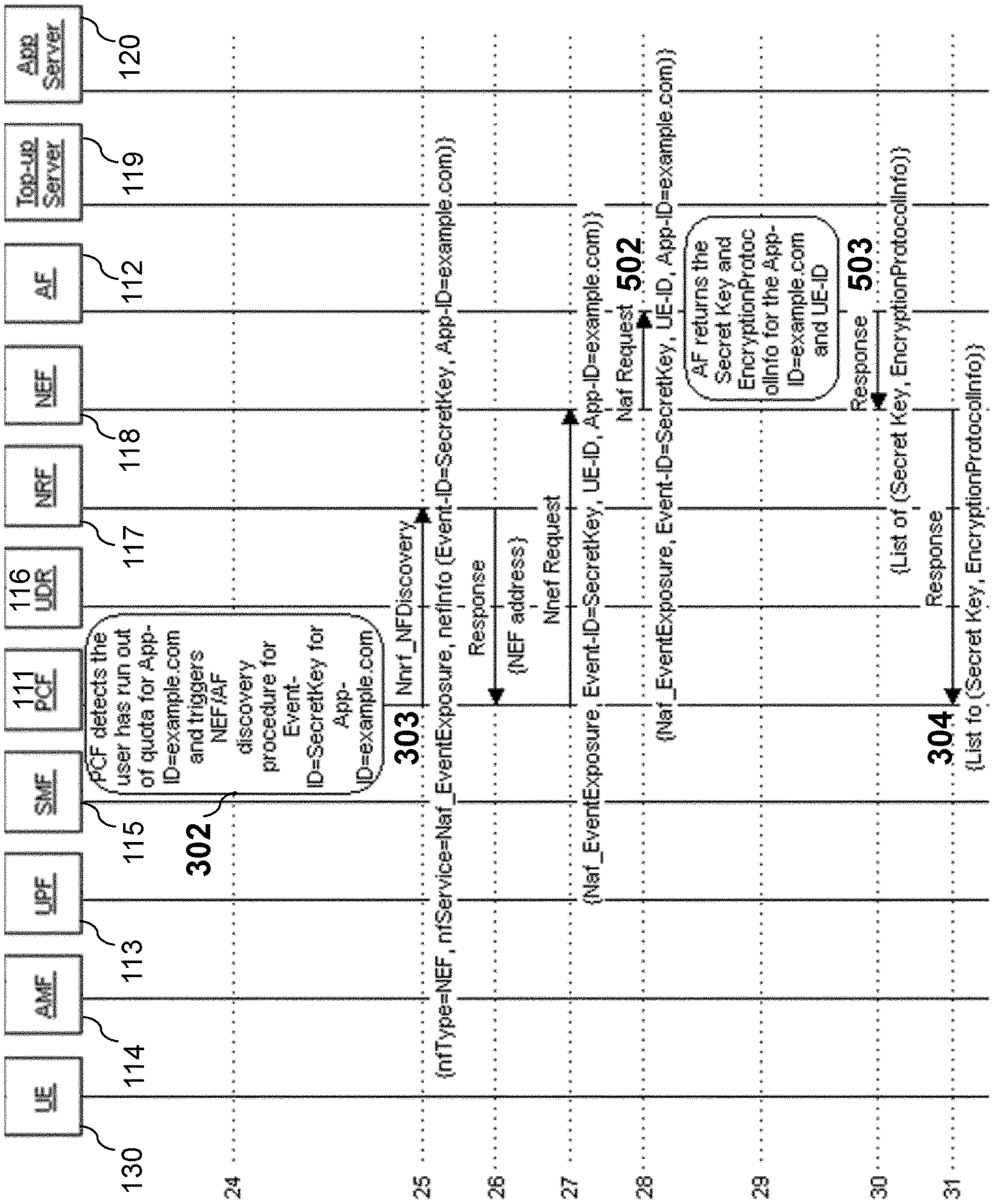
FIG. 10 is a schematic diagram depicting a continuation of FIG. 9.

FIG. 10 is a continuation of the procedure depicted in FIG. 9. At step 24, in agreement with Action 302, the first node 111 detects the user has run out of quota for App-ID=example.com and triggers a NEF/AF discovery procedure for the Event-ID=SecretKey for the App-ID=example.com. At step 25, the first node 111, in accordance with Action 303, triggers an AF discovery, through the eight node 118, relative to the Event-ID=SecretKey for Naf_EventExposure service. In order to do this, the first node 111 triggers a Nnrf_NFDiscovery message towards the seventh node 117 by including the following parameters: nfType=NEF, nfService=Naf_EventExposure and nefInfo (Event-Id=SecretKey, App-ID=example.com). At step 26, the seventh node 117 returns the NEF instance to the first node 111. At step 27, the first node 111 triggers a request to the Event-ID=SecretKey for Naf_EventExposure service through the eighth node 118, by sending a Nnef request message towards the eighth node 118, and including the following parameters: Naf_EventExposure service, Event-ID=SecretKey, UE-ID, and App-ID=example.com. At step 28, the eighth node 118 triggers a request to the Event-ID=SecretKey for the Naf_EventExposure service, by sending a Naf request message towards the second node 112, which the second node 112 receives in accordance with Action 502. The request message includes the following parameters, which are the same as in step 27 above, Naf_EventExposure service, Event-ID=SecretKey, UE-ID and App-ID=example.com. At steps 29 and 30, the second node 112 accepts the request and, in accordance with Action 503, returns the following parameters: the one or more keys and the one or more indications, in this example as a List of (Secret Key, EncryptionProtocolInfo). The one or more keys may be each indicated by a "SecretKey" parameter, which identifies the secret key used for symmetric encryption, that is, used both for traffic encryption and decryption, e.g., for the encrypted flow within App-ID and for the UE-ID. One of the one or more indications, in this example, the "EncryptionProtocolInfo", may each include information relative to the encrypted flow, e.g., 5-tuple, and the encryption protocol used for the App-ID and for the UE-ID, e.g. TLS 1.3, QUIC Crypto, etc. At step 31, the eighth node 118 forwards the information in step 30 above to the first node 111, which the first node 111 receives in accordance with Action 304.

Figure 11:
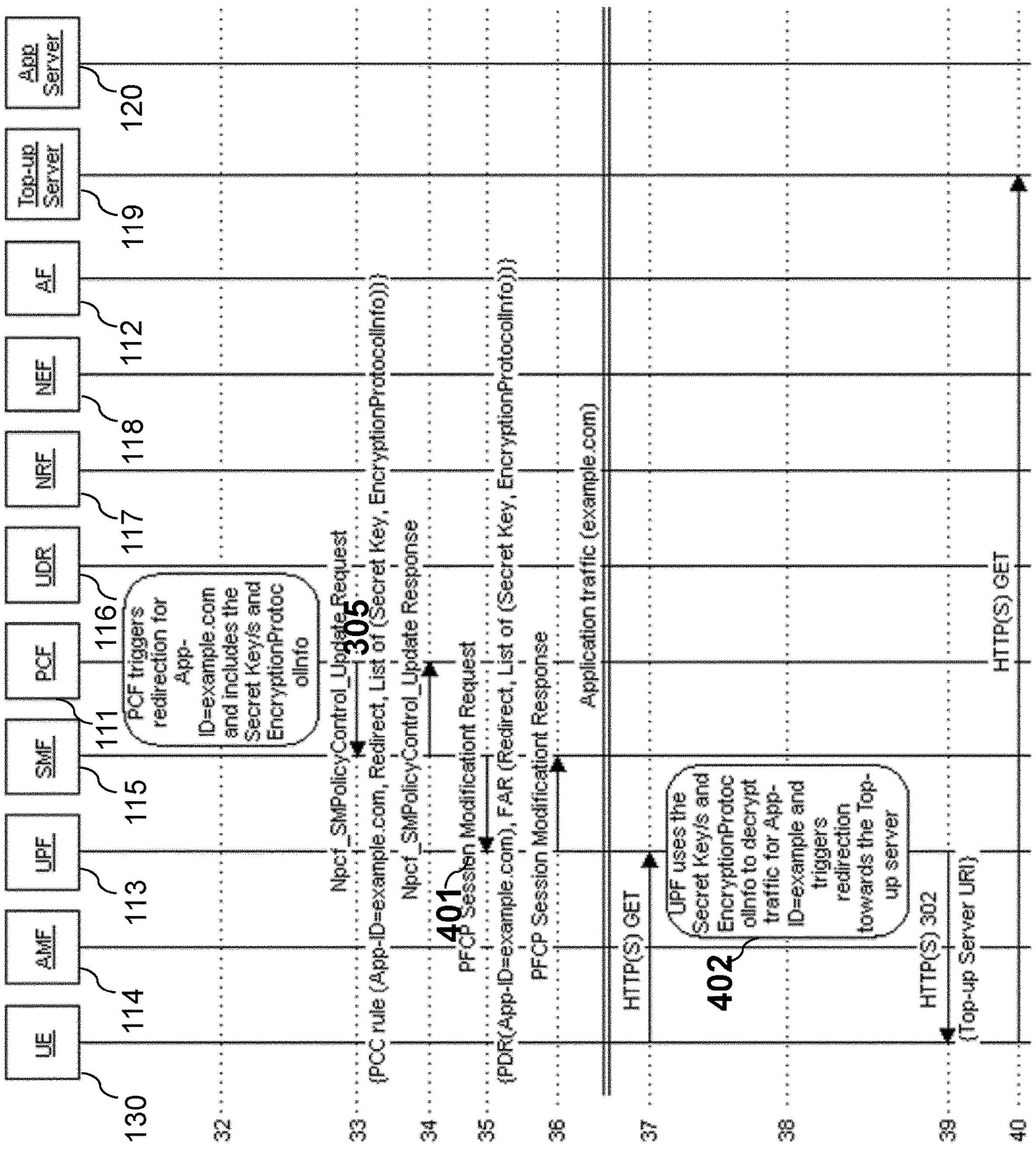
FIG. 11 is a schematic diagram depicting a continuation of FIG. 10.

FIG. 11 is a continuation of the procedure depicted in FIG. 10. At steps 32 and 33, the first node 111 triggers redirection for App-ID=example.com and includes the one or more Secret Keys and associated EncryptionProtocolInfo. In order to do this, the first node 111, in accordance with Action 305, triggers a Npcf_SMPolicyControl_Update Request message to the fifth node 115 including a PCC rule with the following parameters: App-ID=example.com, Enforcement action=Redirect, List of (Secret Key, EncryptionProtocolInfo). At step 34, the fifth node 115 answers back to the first node 111 with a Npcf_SMPolicyControl_Update Response message. At step 35, the fifth node 115 triggers towards the third node 113 a PFCP Session Modification Request message including the following parameters: PDR, e.g., App-ID=example.com, FAR, e.g., Redirect action, List of (Secret Key, EncryptionProtocolInfo), which the third node 113 receives in agreement with Action 401. At step 36, the third node 113 answers back to the fifth node 115 with a PFCP Session Modification Response message. At step 37, the application run by the user of the second endpoint 130, e.g., example.com, triggers a HTTP(S) GET request towards the first endpoint 120, that is, the application server. At steps 38 and 39, the third node 113 detects application traffic by matching the PDR with the PDI App-ID=example.com, and, in agreement with Action 402, uses the Secret Key corresponding to the encrypted flow, based on the EncryptionProtocolInfo, e.g. which indicates the 5-tuple and to which protocol the SecretKey applies to, to decrypt traffic for that flow within App-ID=example. The third node 113 then triggers redirection towards the ninth node 119, e.g., a top-up server, by answering to the second endpoint 130 with a HTTP(S) 302 message including the Top-up server Uniform Resource Identifier (URI) as parameter. At step 40, the second endpoint 130 triggers a new connection towards the ninth node 119, and sends a HTTP(S) GET request towards the ninth node 119.

Figure 12:
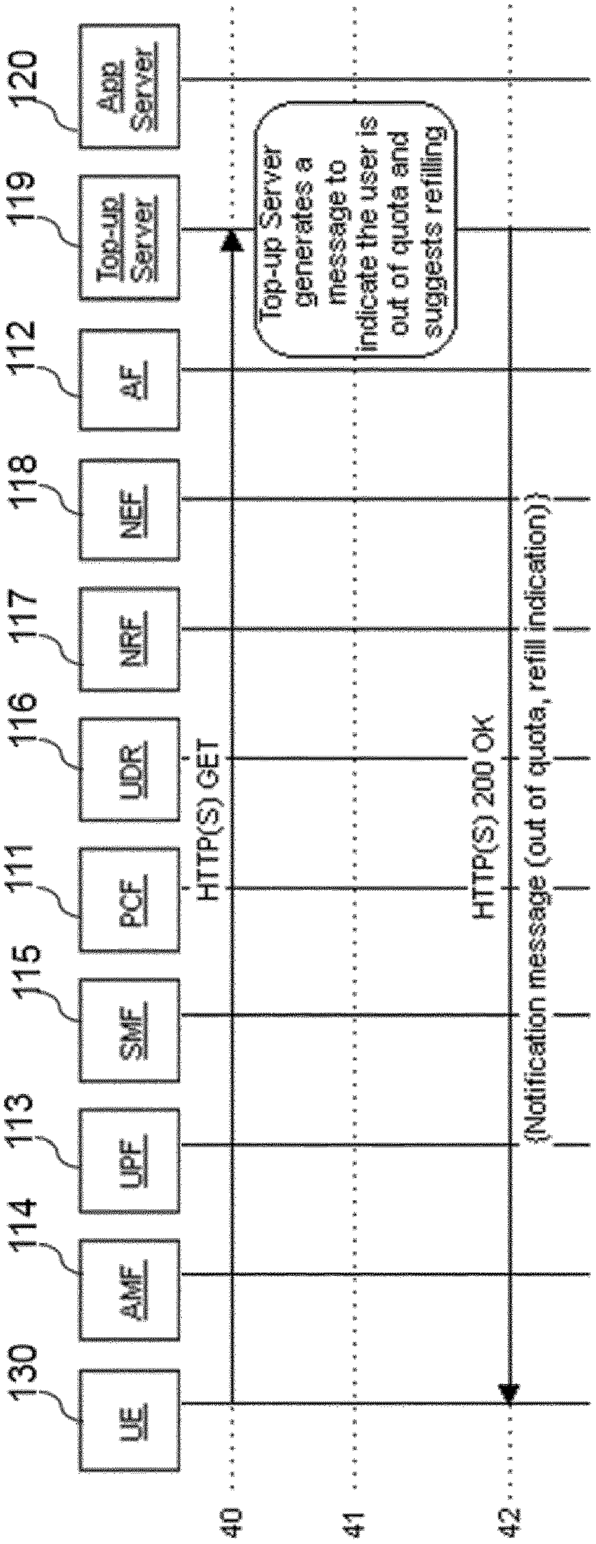
FIG. 12 is a schematic diagram depicting a continuation of FIG. 11.

FIG. 12 is a continuation of the procedure depicted in FIG. 11. At steps 41 and 42, the ninth node 119 ninth node 119 generates a HTTP(s) 200 OK message towards the second endpoint 130, including a notification message indicating the user is out of quota and a refill indication.

Figure 13:
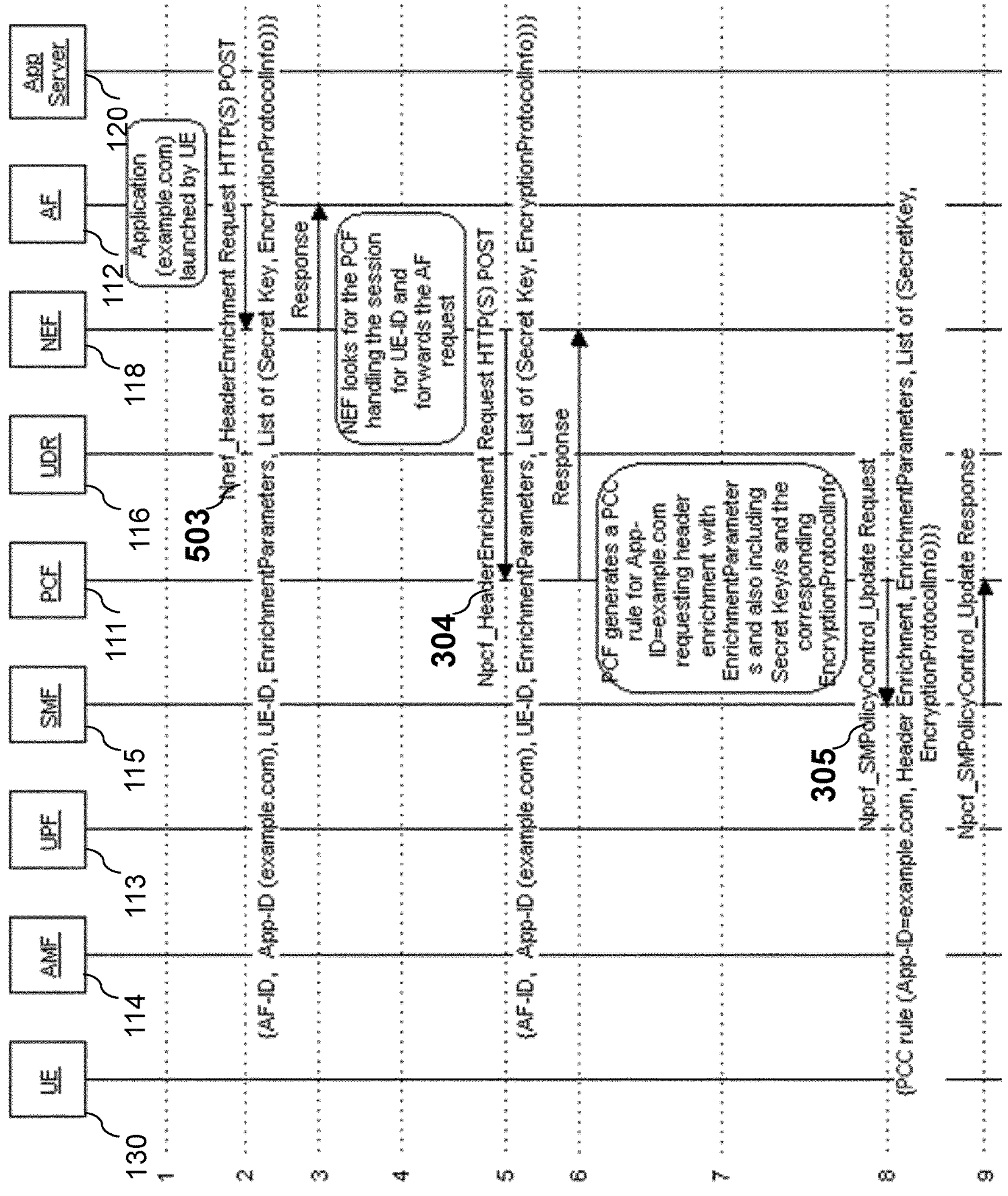
FIG. 13 is a schematic diagram depicting another non-limiting example of signalling between nodes in a communications system, according to embodiments herein.

FIG. 13 is a signalling diagram depicting a second non-limiting example of embodiments herein illustrating an HTTP header enrichment use case. Particularly, the sequence diagram shown in FIG. 13 shows an example for the content provider requesting the network operator to apply HTTP header enrichment for a certain subscriber and application, e.g., example.com, when the application is based on HTTPS/TLS or QUIC transport. The steps of this example are detailed below. In this non-limiting example, the first node 111 is a PCF, the second node 112 is an AF, the third node 113 is an UPF, the first endpoint 120 is an Application Server (App Server) and the second endpoint 130 is a UE. In this example, in step 1, the second endpoint 130 launches an application, e.g., example.com, being it a HTTP/TLS or QUIC based application. The TLS handshake is performed between the application client and the application server. How the second node 112 is notified of that, e.g., by the first endpoint 120, e.g., an application server (App Server), is out of scope for this disclosure, as the main focus is on the interaction between the content provider and the network operator. At step 2, the second node 112, triggers towards the eighth node, e.g., a NEF of a network operator, a request to apply HTTP header enrichment for that subscriber and application, that is, example.com. According to embodiments herein, as described in Action 503, it is proposed to extend the Nnef northbound interface, so that the second node 112 may trigger a Nnef_HeaderEnrichment Request in a HTTP(S) POST message including the following parameters: a) an indication of the application, for example, an identifier such as AF-ID which identifies the second node 112, b) an indication of the application to which the request form the second node 112 applies to, for example, an identifier such as App-ID, e.g. example.com, c) an indication which indicates the user to which the second node 112 request applies to, for example, an identifier such as UE-ID, d) an indication of the parameters of interest for the second node 112, such as EnrichmentParameters, identifying the second node 112, so that the Mobile Network Operator (MNO) may be requested to trigger header enrichment with those parameters, e.g., Radio Access Technology (RAT) type, MSISDN, IMSI, etc.) the one or more keys and the one or more indications as, e.g., a List of (Secret Key, EncryptionProtocolInfo). The SecretKey may identify the secret key used for symmetric encryption, that is, used both for traffic encryption and decryption, for the encrypted flow within App-ID and for the UE-ID. EncryptionProtocolInfo may include information relative to the encrypted flow, e.g., 5-tuple, and the encryption protocol used for the App-ID and for the UE-ID, e.g. TLS 1.3, QUIC Crypto, etc. At step 3, the eighth node 118, e.g., the NEF, acknowledges the request from the second node 112. At step 4, the eighth node 118 looks for the first node 111 handling the session for the second endpoint 130, e.g., for the UE-ID, e.g., based on existing 3GPP procedures. At step 5, the eighth node 118 forwards the second node 112 request in step 2 above, including the same parameters, towards the discovered first node 111 instance, which the first node 111 receives in agreement with Action 304. At step 6, the first node 111, acknowledges the request from the eighth node 118. At step 7, the first node 111 generates a PCC rule for App-ID=example.com requesting header enrichment with EnrichmentParameters and also including the parameters SecretKey/s and the corresponding EncryptionProtocolInfo. At step 8, the first node 111 sends the PCC rule generated in step above towards the fifth node 115 by, in accordance with Action 305, triggering a Npcf_SMPolicyControl_Update Request message, including the following parameters: i) App-ID, e.g., example.com, which indicates to which traffic the PCC rule applies to, ii) Header Enrichment, which indicates Header Enrichment as the PCC rule enforcement action, iii) EnrichmentParameters, which identifies the parameters to enrich with, e.g., RAT Type, MSISDN, IMSI, etc, iv) the one or more keys and the one or more indications as a List of (Secret Key, EncryptionProtocolInfo), where SecretKey may be understood to identify the secret key used for symmetric encryption, that is, used both for traffic encryption and decryption, for this the encrypted flow within App-ID and the UE-ID. EncryptionProtocolInfo, may be understood to include information relative to the encrypted flow, e.g., 5-tuple, and the encryption protocol used for the App-ID and for the UE-ID, e.g. TLS 1.3, QUIC Crypto, etc. At step 9, the fifth node 115 answers back to the first node 111 with a Npcf_SMPolicyControl_Update Response message.

Figure 14:
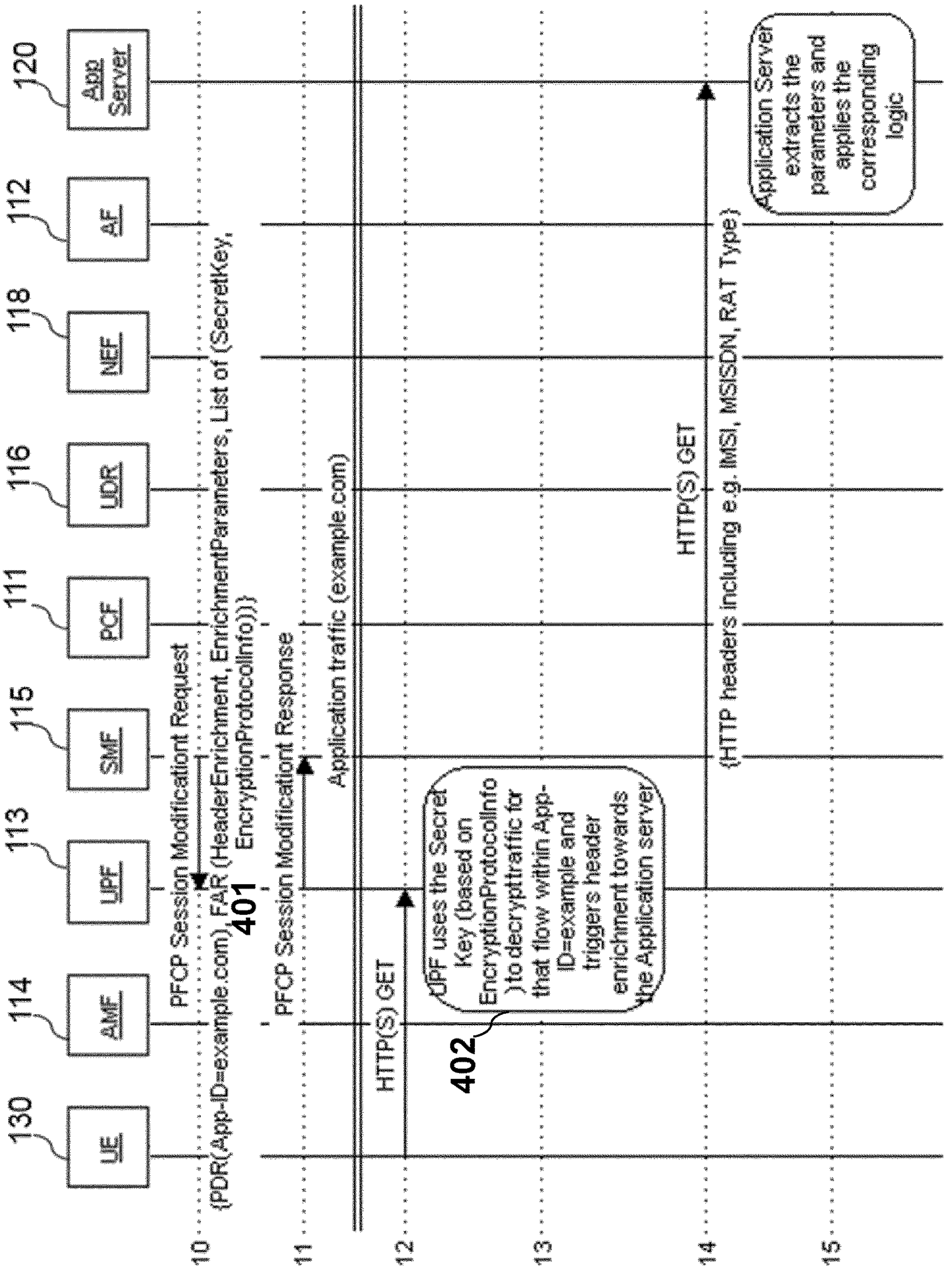
FIG. 14 is a schematic diagram depicting a continuation of FIG. 13.

FIG. 14 is a continuation of the procedure depicted in FIG. 13. At step 10, the fifth node 115 triggers towards the third node 113 a PFCP Session Modification Request message including the following parameters: PDR, e.g., App-ID=example.com, and FAR, indicating the HeaderEnrichment action with the EnrichmentParameters, the List of (SecretKey, EncryptionProtocolInfo). The third node 113 receives the one or more keys, the one or more indications and the one or more second indications in accordance with Action 401. At step 11, the third node 113 answers back to the fifth node 115 with a PCP Session Modification Response message. At step 12, the user's application in the second endpoint 130, e.g., example.com, triggers a HTTP(S) GET request towards the third node 113. At steps 13 and 14, the third node 113, in accordance with Action 402, uses the SecretKey corresponding to the encrypted flow, based on the EncryptionProtocolInfo, e.g. which indicates the 5-tuple and to which protocol the SecretKey applies to, to decrypt traffic for that flow within App-ID=example.com and triggers header enrichment with the EnrichmentParameters, e.g., RAT Type, IMSI, MSISDN, towards the first endpoint 120. At step 15, the first endpoint 120, extracts the parameters, e.g., RAT Type, IMSI, MSISDN, from the HTTP headers and applies the corresponding logic.

The embodiments described herein may be understood to not only apply to 5G network architecture, but the same mechanisms may be applied to, for example, 4G, just by replacing: AF by a Service Capability Server/Application Server (SCS/AS), the NEF by a Service Capability Exposure Function (SCEF), the PCF by a Policy and Charging Rule Function (PCRF), the SMF by a Packet Gateway Control Plane (PGW-C) or a Traffic Detection Function Control Plane (TDF-C), and the UPF by a Packet Gateway User Plane (PGW-U) or a Traffic Detection Function User Plane (TDF-U).

As a simplified example overview of the foregoing, embodiments herein may be understood to relate to a mechanism which may enable to solve the earlier described problems of the existing methods, and which may be understood to be based on an extension of the exposure policy framework, specifically by the content provider, e.g., the AF, to expose to the network operator, e.g., the NEF, the one or more secret keys used to encrypt and decrypt application traffic, e.g., for a certain application and for a certain subscriber. This collaborative solution, which may be based on an SLA agreement between the network operator and the content provider, may allow the network operator to detect the subscriber traffic for a certain application and to apply the corresponding traffic management actions, such as redirection, content enrichment, parental control, etc, in a simple and efficient way when the traffic is encrypted using symmetric encryption. The exchange of the one or more secret keys between the content provider and the network operator may be done in a secure way by using an encrypted channel between AF and NEF, e.g., the Nnef northbound interface may include TLS in its protocol stack.

As a summarized overview of a particular example of embodiments herein, a content provider, e.g., an AF, may triggers an onboarding procedure into network operator's NEF indicating the support of a new event, e.g., Event-ID=SecretKey, as part of the Naf_EventExposure service, including the following parameters: a list of App-ID indicating the App-IDs to which the AF may provide the new event, and a list of users indicating the users to which the AF may provide the event, e.g., UE-ID or list of UE-ID, UE-Group-ID or list of UE-Group-ID, AnyUE. This parameter may be optional as by default it may be set to AnyUE. After the onboarding procedure, the AF, or the NEF on behalf of the AF, may register the above event in the NRF, allowing discovery by any potential consumer. The NEF may store in the UDR support for the new event, e.g., Event-ID=SecretKey, for the App-ID/s and user/s indicated above. This may be stored either as application data, for the App-ID/s, or as part of the subscriber profile, e.g., for the UE-ID/s. The AF may implement a new event, e.g., Event-ID=SecretKey, as part of the Naf_EventExposure service, which may allow request/response and subscribe/notify operations from a consumer, e.g., PCF through NEF. Input parameters may be the Event-ID=SecretKey, the List of UE-ID, which may identify the UE/s, the List of App-ID, which may identify the application/s, e.g., example.com. The output parameters may be: a) the Event-ID=SecretKey, b) the Result, by which the content provider, that is, the AF, may indicate to the network operator, that is, the NEF, that it accepts/rejects the request, c) the one or more secret keys and the one or more indications, which may be provided, e.g., as a List of (Secret Key/s, EncryptionProtocolInfo). With regards to the one or more secret keys, there may be one secret key per encrypted flow for the requested/subscribed App-ID and UE-ID; it/they may be included in the response message, if the AF accepts the request. In case of a subscribe operation, the secret key may be included in the notify message, typically when the user may open the application. One of the one or more indications, e.g., the EncryptionProtocolInfo, may include information relative to the encrypted flow, e.g. 5-tuple, and the encryption protocol used for the App-ID, e.g. TLS 1.3, QUIC Crypto, etc. For a certain subscriber's PDU session, whenever the network operator may need to apply a traffic management action, e.g., the PCF may detect that the user has run out of quota for a certain application and may need to be redirected. The PCF may then run the following logic. The PCF may trigger the AF/NEF discovery relative to the Event-ID=SecretKey, as part of the Naf_EventExposure service, for a certain application. As a result, the PCF may obtain the AF/NEF instance. Once the AF/NEF instance may have been obtained, the PCF may trigger either a request/response or subscribe/notify operation to the Event-ID=SecretKey, as part of the Naf_EventExposure service, by including: the UE-ID or the List of UE-ID, the App-ID or the List of App-ID. Based on the above request/subscribe to the Event-ID=SecretKey, as part of the Naf_EventExposure service, the AF may apply the following logic. The AF may accept/reject the request. In case AF accepts the request, the AF may return the one or more secret keys, e.g., one secret key per encrypted flow within App-ID, and the encryption protocol information, e.g., per encrypted flow within App-ID.

In case of subscribe operation, the AF may notify the PCF, e.g., through the NEF, including the one or more secret keys, e.g., one secret key per encrypted flow within App-ID, and the encryption protocol information, e.g., per encrypted flow within App-ID. The PCF may forward the one or more secret keys and the encryption protocol information to the UPF, e.g., through the SMF, so the UPF may decrypt traffic for the App-ID and execute the corresponding Traffic Management action, e.g., redirection, content enrichment, content filtering, etc.

One advantage of embodiments herein is that they may allow the operator of the communications network operator to support traffic management actions, e.g., redirection, content enrichment, parental control, for subscriber traffic in a simple an efficient way.

Embodiments herein may also allow the operator of the communications network to detect the traffic from the application, especially when the traffic is encrypted by means of symmetric encryption.

Figure 15:
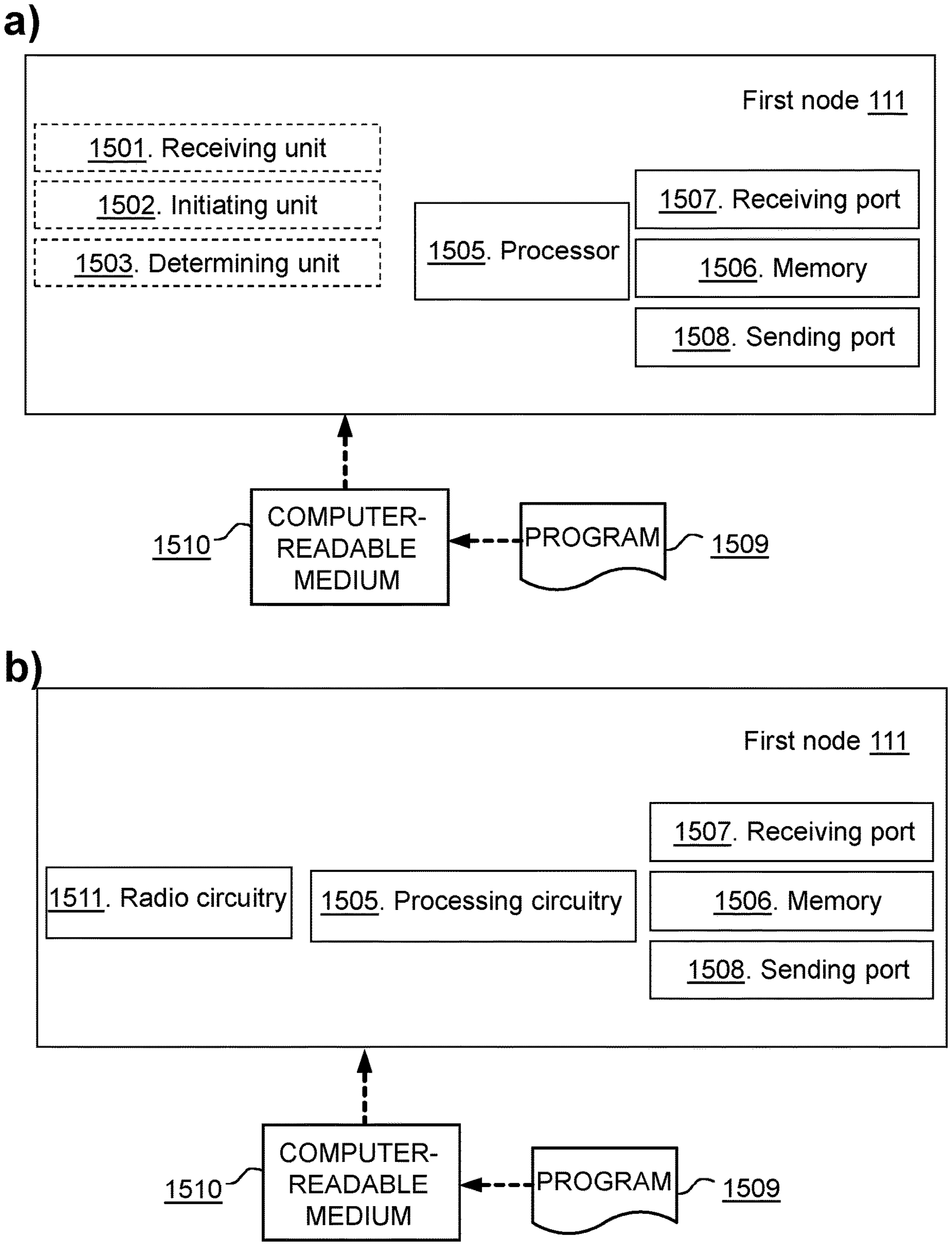
FIG. 15 is a schematic block diagram illustrating two non-limiting examples, a) and b), of a first node, according to embodiments herein.

FIG. 15 depicts two different examples in panels a) and b), respectively, of the arrangement that the first node 111 may comprise to perform the method actions described above in relation to FIG. 3, FIG. 6, and/or FIGS. 7-14. In some embodiments, the first node 111 may comprise the following arrangement depicted in FIG. 15*a*. The first node 111 may be understood to be for handling encrypted traffic in the communications system 100. The first node 111 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 15, optional boxes are indicated by dashed lines. The detailed description of some of the following corresponds to the same references provided above, in relation to the actions described for the first node 111 and will thus not be repeated here. For example, the first node 111 may be configured to be a PCF, the second node 112 may be configured to be an AF, the third node 113 may be configured to be a UPF, or another node configured to operate in the communications system 100.

The first node 111 is configured to, e.g. by means of a receiving unit 1501 within the first node 111 configured to, receive, directly, or indirectly, from the second node 112 configured to operate in the communications system 100 the one or more keys configured to enable decryption by the third node 113 configured to operate in the communications system 100 of encrypted traffic. The traffic is configured to be routed between the two or more endpoints 130, 120 via the communications system 100. The traffic is configured to be encrypted between the two or more endpoints 130, 120. The first node 111 is further configured to, receive the one or more indications. The one or more indications are configured to indicate the respective protocol to be used with the one or more keys to enable decryption of the encrypted traffic.

The first node 111 is also configured to, e.g. by means of an initiating unit 1502 within the first node 111 configured to, initiate sending the one or more keys and the one or more indications to the third node 113, thereby enabling decryption of the encrypted traffic. The first node 111 and the third node 113 are configured to be different from any of the two or more endpoints 130, 120.

In some embodiments, at least one of the following may apply: a) the traffic may be configured to belong to the established session between the two or more endpoints 130, 120, and the one or more keys may be configured to be sent and valid during the established session, and b) the traffic may be configured to comprise a the plurality of flows. The one or more indications may be further configured to indicate, for each flow of the plurality of flows, the respective key, of the one or more keys, that may be configured to enable decryption.

In some embodiments, the first node 111 may be configured to, e.g. by means of a determining unit 1503 within the first node 111 configured to, determine the need to decrypt the traffic.

The first node 111 may be further configured to, e.g. by means of the initiating unit 1502 further configured to, initiate fetching the one or more keys from the second node 112. The initiating fetching may be configured to be based on the need to decrypt configured to be determined.

The first node 111 may be further configured to, e.g. by means of the receiving unit 1501 further configured to, receive the first indication configured to indicate that the second node 112 has the capability to provide the one or more keys to decrypt the traffic. The initiating of the fetching may be configured to be based on the first indication configured to be received.

In some embodiments, the receiving of the first indication may be further configured to comprise receiving the one or more second indications configured to indicate the session between the two or more endpoints 130, 120 for which decryption with the one or more keys may be configured to be applicable.

In some embodiments, the one or more second indications may be configured to indicate at least one of: a) the one or more applications for which the second node 112 may be configured to support the capability, and the initiating sending the one or more keys and the one or more indications may be further configured to comprise initiating sending the one or more second indications, and b) the at least one of the two or more endpoints 130, 120.

In some embodiments, the first indication may be configured to be received for at least one of the two or more endpoints 130 configured to be indicated by the first node 111.

The embodiments herein may be implemented through one or more processors, such as a processor 1505 in the first node 111 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1506 comprising one or more memory units. The memory 1506 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114, the fifth node 115, the sixth node 116, the seventh node 117, the eighth node 118, the ninth node 119, and/or any of the at least two endpoints 120, 130 through a receiving port 1507. In some examples, the receiving port 1507 may be, for example, connected to one or more antennas in the first node 111. In other embodiments, the first node 111 may receive information from another structure in the communications system 100 through the receiving port 1507. Since the receiving port 1507 may be in communication with the processor 1505, the receiving port 1507 may then send the received information to the processor 1505. The receiving port 1507 may also be configured to receive other information.

The processor 1505 in the first node 111 may be further configured to transmit or send information to e.g., the second node 112, the third node 113, the fourth node 114, the fifth node 115, the sixth node 116, the seventh node 117, the eighth node 118, the ninth node 119, any of the at least two endpoints 120, 130 and/or another structure in the communications system 100, through a sending port 1508, which may be in communication with the processor 1505, and the memory 1506.

Those skilled in the art will also appreciate that any of the units 1501-1503 described above may refer to a combination of analog and digital circuits, and/or one or more processors configured with software and/or firmware, e.g., stored in memory, that, when executed by the one or more processors such as the processor 1505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1501-1503 described above may be the processor 1505 of the first node 111, or an application running on such processor.

Thus, the methods according to the embodiments described herein for the first node 111 may be respectively implemented by means of a computer program 1509 product, comprising instructions, i.e., software code portions, which, when executed on at least one processor 1505, cause the at least one processor 1505 to carry out the actions described herein, as performed by the first node 111. The computer program 1509 product may be stored on a computer-readable storage medium 1510. The computer-readable storage medium 1510, having stored thereon the computer program 1509, may comprise instructions which, when executed on at least one processor 1505, cause the at least one processor 1505 to carry out the actions described herein, as performed by the first node 111. In some embodiments, the computer-readable storage medium 1510 may be a non-transitory computer-readable storage medium, such as a CD ROM disc, a memory stick, or stored in the cloud space. In other embodiments, the computer program 1509 product may be stored on a carrier containing the computer program, wherein the carrier is one of an electronic signal, optical signal, radio signal, or the computer-readable storage medium 1510, as described above.

The first node 111 may comprise an interface unit to facilitate communications between the first node 111 and other nodes or devices, e.g., the second node 112, the third node 113, the fourth node 114, the fifth node 115, the sixth node 116, the seventh node 117, the eighth node 118, the ninth node 119, any of the at least two endpoints 120, 130 and/or another structure in the communications system 100. In some particular examples, the interface may, for example, include a transceiver configured to transmit and receive radio signals over an air interface in accordance with a suitable standard.

In other embodiments, the first node 111 may comprise the following arrangement depicted in FIG. 15*b*. The first node 111 may comprise a processing circuitry 1505, e.g., one or more processors such as the processor 1505, in the first node 111 and the memory 1506. The first node 111 may also comprise a radio circuitry 1511, which may comprise e.g., the receiving port 1507 and the sending port 1508. The processing circuitry 1505 may be configured to, or operable to, perform the method actions according to FIG. 3, FIG. 6, and/or FIGS. 7-14, in a similar manner as that described in relation to FIG. 15*a*. The radio circuitry 1511 may be configured to set up and maintain at least a wireless connection with the second node 112, the third node 113, the fourth node 114, the fifth node 115, the sixth node 116, the seventh node 117, the eighth node 118, the ninth node 119, any of the at least two endpoints 120, 130 and/or another structure in the communications system 100.

Hence, embodiments herein also relate to the first node 111 operative to handle encrypted traffic in the communications system 100, the first node 111 being operative to operate in the communications system 100. The first node 111 may comprise the processing circuitry 1505 and the memory 1506, said memory 1506 containing instructions executable by said processing circuitry 1505, whereby the first node 111 is further operative to perform the actions described herein in relation to the first node 111, e.g., in FIG. 3, FIG. 6, and/or FIGS. 7-14.

Figure 16:
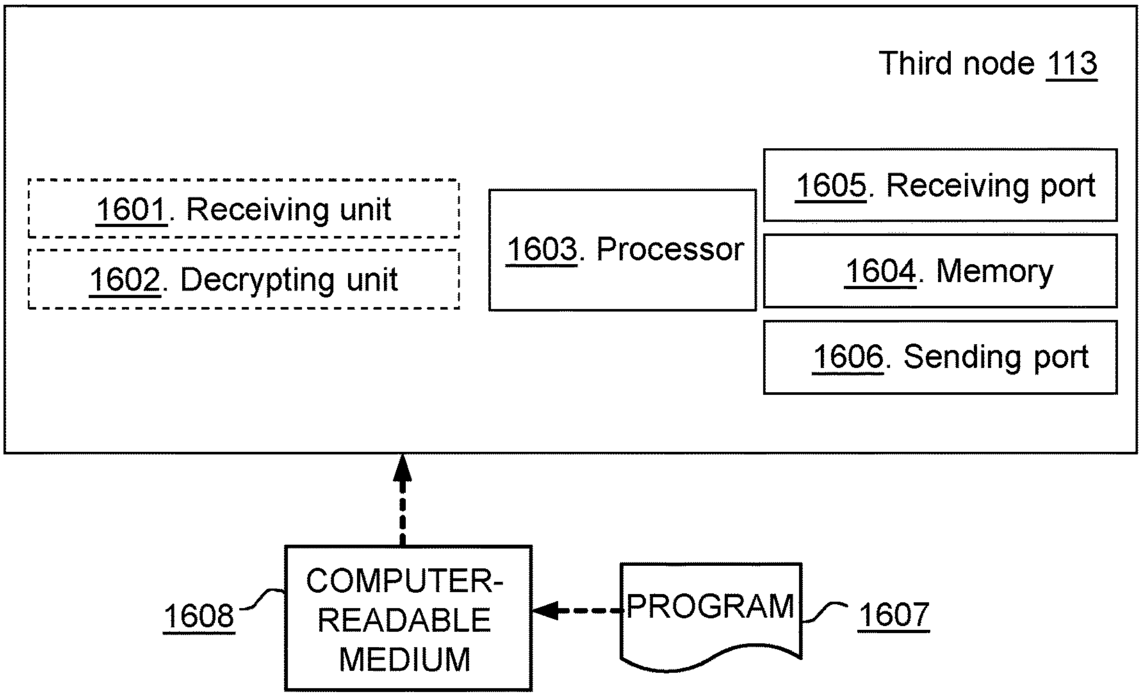
FIG. 16 is a schematic block diagram illustrating two non-limiting examples, a) and b), of a third node, according to embodiments herein.
Figure 16:
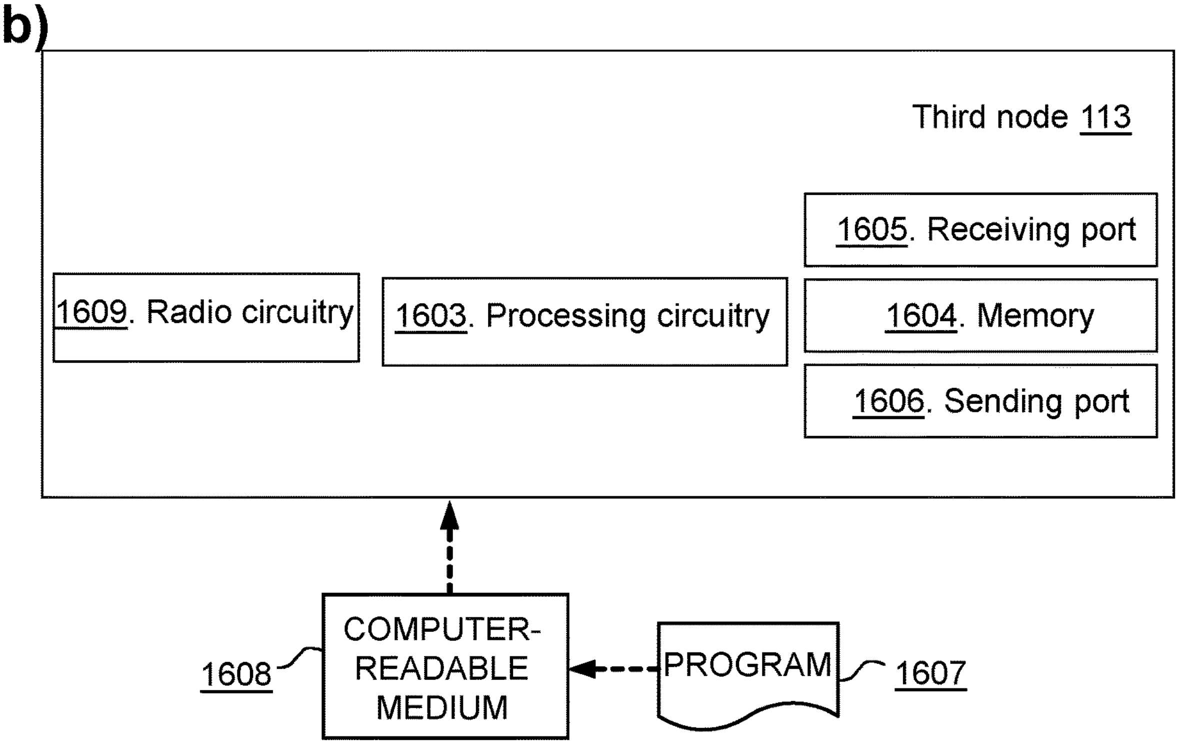

FIG. 16 depicts two different examples in panels a) and b), respectively, of the arrangement that the third node 113 may comprise to perform the method actions described above in relation to FIG. 4, FIG. 6, and/or FIGS. 7-14. In some embodiments, the third node 113 may comprise the following arrangement depicted in FIG. 16*a*. The third node 113 may be understood to be for handling encrypted traffic in a communications system 100. The third node 113 may be configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 16, optional boxes are indicated by dashed lines. The detailed description of some of the following corresponds to the same references provided above, in relation to the actions described for the third node 113 and will thus not be repeated here. For example, the first node 111 may be configured to be a PCF, and the third node 113 may be configured to be a UPF.

The third node 113 is configured to, e.g. by means of a receiving unit 1601 within the third node 113 configured to receive, from the first node 111 configured to operate in the communications system 100: a) the one or more keys configured to enable decryption of traffic configured to be routed between two or more endpoints 130, 120 via the communications system 100; the traffic is configured to be encrypted between the two or more endpoints 130, 120, b) the one or more indications configured to indicate the respective protocol configured to be used with the one or more keys to enable decryption of the encrypted traffic, and c) the one or more second indications configured to indicate the session between the two or more endpoints 130, 120 for which decryption with the one or more keys is configured to be applicable.

The third node 113 is also configured to, e.g. by means of a decrypting unit 1602 within the third node 113 configured to decrypt the traffic for the session configured to be indicated with the one or more keys configured to be received, according to the respective protocol, to perform the management operation on the traffic. The first node 111 and the third node 113 are configured to be different from any of the two or more endpoints 130, 120.

In some embodiments, at least one of the following may apply: a) the traffic may be configured to belong to the session, configured to be established between the two or more endpoints 130, 120, and the one or more keys may be configured to be received and valid during the established session, and b) the traffic may be configured to comprise the plurality of flows. The one or more indications may be further configured to indicate, for each flow of the plurality of flows, the respective key, of the one or more keys, that may be configured to enable decryption.

In some embodiments, the one or more second indications may be configured to indicate at least one of: a) the one or more applications for which decryption with the one or more keys the one or more keys may be configured to be applicable, and b) the at least one of the two or more endpoints 130, 120.

The embodiments herein may be implemented through one or more processors, such as a processor 1603 in the third node 113 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The third node 113 may further comprise a memory 1604 comprising one or more memory units. The memory 1604 is arranged to be used to store obtained information, store data, configurations, schedulings, and applications etc. to perform the methods herein when being executed in the third node 113.

In some embodiments, the third node 113 may receive information from, e.g., the first node 111, the second node 112, the fourth node 114, the fifth node 115, the sixth node 116, the seventh node 117, the eighth node 118, the ninth node 119, and/or any of the at least two endpoints 120, 130, through a receiving port 1605. In some examples, the receiving port 1605 may be, for example, connected to one or more antennas in the third node 113. In other embodiments, the third node 113 may receive information from another structure in the communications system 100 through the receiving port 1605. Since the receiving port 1605 may be in communication with the processor 1603, the receiving port 1605 may then send the received information to the processor 1603. The receiving port 1605 may also be configured to receive other information.

The processor 1603 in the third node 113 may be further configured to transmit or send information to e.g., the first node 111, the second node 112, the fourth node 114, the fifth node 115, the sixth node 116, the seventh node 117, the eighth node 118, the ninth node 119, any of the at least two endpoints 120, 130, and/or another structure in the communications system 100, through a sending port 1606, which may be in communication with the processor 1603, and the memory 1604.

Those skilled in the art will also appreciate that the units 1601-1602 described above may refer to a combination of analog and digital circuits, and/or one or more processors configured with software and/or firmware, e.g., stored in memory, that, when executed by the one or more processors such as the processor 1603, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The units 1601-1602 described above may be the processor 1603 of the third node 113, or an application running on such processor.

Thus, the methods according to the embodiments described herein for the third node 113 may be respectively implemented by means of a computer program 1607 product, comprising instructions, i.e., software code portions, which, when executed on at least one processor 1603, cause the at least one processor 1603 to carry out the actions described herein, as performed by the third node 113. The computer program 1607 product may be stored on a computer-readable storage medium 1608. The computer-readable storage medium 1608, having stored thereon the computer program 1607, may comprise instructions which, when executed on at least one processor 1603, cause the at least one processor 1603 to carry out the actions described herein, as performed by the third node 113. In some embodiments, the computer-readable storage medium 1608 may be a non-transitory computer-readable storage medium, such as a CD ROM disc, a memory stick, or stored in the cloud space. In other embodiments, the computer program 1607 product may be stored on a carrier containing the computer program, wherein the carrier is one of an electronic signal, optical signal, radio signal, or the computer-readable storage medium 1608, as described above.

The third node 113 may comprise an interface unit to facilitate communications between the third node 113 and other nodes or devices, e.g., the first node 111, the second node 112, the fourth node 114, the fifth node 115, the sixth node 116, the seventh node 117, the eighth node 118, the ninth node 119, any of the at least two endpoints 120, 130, and/or another structure in the communications system 100. In some particular examples, the interface may, for example, include a transceiver configured to transmit and receive radio signals over an air interface in accordance with a suitable standard.

In other embodiments, the third node 113 may comprise the following arrangement depicted in FIG. 16*b*. The third node 113 may comprise a processing circuitry 1603, e.g., one or more processors such as the processor 1603, in the third node 113 and the memory 1604. The third node 113 may also comprise a radio circuitry 1609, which may comprise e.g., the receiving port 1605 and the sending port 1606. The processing circuitry 1603 may be configured to, or operable to, perform the method actions according to FIG. 4, FIG. 6, and/or FIGS. 7-14, in a similar manner as that described in relation to FIG. 16*a*. The radio circuitry 1609 may be configured to set up and maintain at least a wireless connection with the first node 111, the second node 112, the fourth node 114, the fifth node 115, the sixth node 116, the seventh node 117, the eighth node 118, the ninth node 119, any of the at least two endpoints 120, 130, and/or another structure in the communications system 100.

Hence, embodiments herein also relate to the third node 113 operative to handle encrypted traffic in the communications system 100, the third node 113 being operative to operate in the communications system 100. The third node 113 may comprise the processing circuitry 1603 and the memory 1604, said memory 1604 containing instructions executable by said processing circuitry 1603, whereby the third node 113 is further operative to perform the actions described herein in relation to the third node 113, e.g., in FIG. 4, FIG. 6, and/or FIGS. 7-14.

Figure 17:
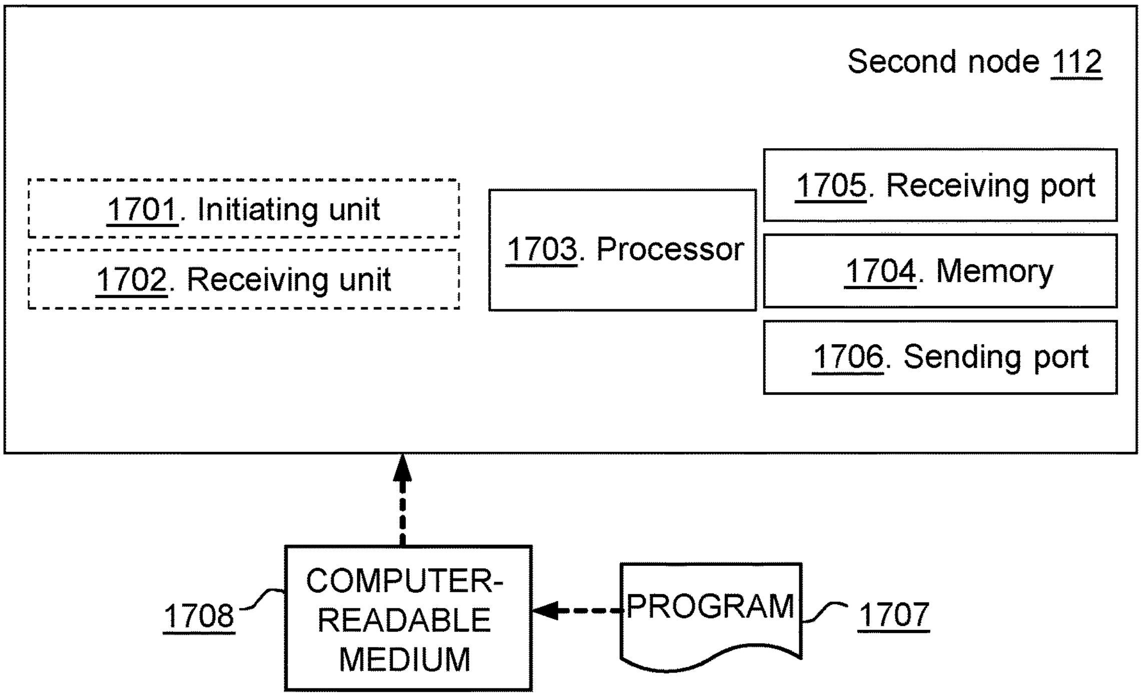
FIG. 17 is a schematic block diagram illustrating two non-limiting examples, a) and b), of a second node, according to embodiments herein.
Figure 17:
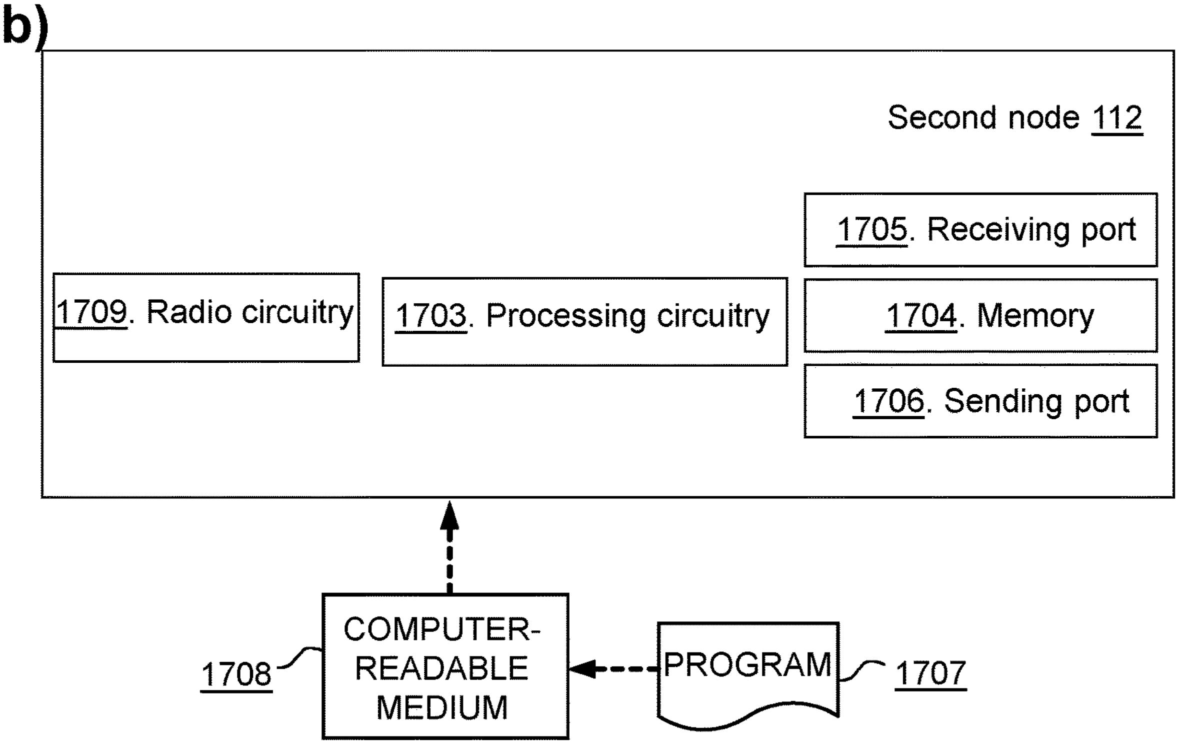

FIG. 17 depicts two different examples in panels a) and b), respectively, of the arrangement that the second node 112 may comprise to perform the method actions described above in relation to FIG. 5, FIG. 6, and/or FIGS. 7-14. In some embodiments, the second node 112 may comprise the following arrangement depicted in FIG. 17*a*. The second node 112 may be understood to be for handling encrypted traffic in a communications system 100. The second node 112 may be configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 17, optional boxes are indicated by dashed lines. The detailed description of some of the following corresponds to the same references provided above, in relation to the actions described for the second node 112 and will thus not be repeated here. For example, the first node 111 may be configured to be a PCF, and the second node 112 may be configured to be an AF.

The second node 112 is configured to, e.g. by means of an initiating unit 1701 within the second node 112 configured to initiate providing, to the first node 111 configured to operate in the communications system 100, the one or more keys and the one or more indications. The one or more keys are configured to enable decryption of traffic configured to be routed between two or more endpoints 130, 120 via the communications system 100. The traffic is configured to be encrypted between the two or more endpoints 130, 120. The first node 111 is configured to be different from any of the two or more endpoints 130, 120. The one or more indications are configured to indicate the respective protocol to be used with the one or more keys to enable decryption of the encrypted traffic.

In some embodiments, at least one of the following may apply: a) the traffic may be configured to belong to the established session between the two or more endpoints 130, 120, and the one or more keys may be configured to be sent and valid during the established session, and b) the traffic may be configured to comprise the plurality of flows. The one or more indications may be configured to further indicate, for each flow of the plurality of flows, the respective key, of the one or more keys, that may be configured to enable decryption.

The second node 112 may also be configured to, e.g. by means of a receiving unit 1702 within the second node 112 configured to receive a) the third indication configured to provide the one or more keys to the first node 111, and b) the one or more second indications of the session between the two or more endpoints 130, 120 for which decryption may be configured to be enabled, and the initiating providing may be configured to be based on the third indication and the one or more second indications configured to be received.

The second node 112 may be configured to, e.g. by means of the initiating unit 1701 within the second node 112 configured to initiate sending the first indication to the first node 111. The first indication may be configured to indicate that the second node 112 may be configured to have the capability to provide the one or more keys to decrypt the traffic. The third indication configured to be received may be configured to be based on the first indication configured to be sent.

In some embodiments, the initiating sending of the first indication may be further configured to comprise sending the one or more second indications configured to indicate the session between the two or more endpoints 130, 120 for which decryption with the one or more keys may be configured to be applicable.

In some embodiments, the one or more second indications may be configured to indicate at least one of: a) the one or more applications for which the second node 112 may be configured to support the capability, and b) the at least one of the two or more endpoints 130, 120.

The embodiments herein may be implemented through one or more processors, such as a processor 1703 in the second node 112 depicted in FIG. 17, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1704 comprising one or more memory units. The memory 1704 is arranged to be used to store obtained information, store data, configurations, schedulings, and applications etc. to perform the methods herein when being executed in the second node 112.

In some embodiments, the second node 112 may receive information from, e.g., the first node 111, the third node 113, the fourth node 114, the fifth node 115, the sixth node 116, the seventh node 117, the eighth node 118, the ninth node 119, and/or any of the at least two endpoints 120, 130, through a receiving port 1705. In some examples, the receiving port 1705 may be, for example, connected to one or more antennas in the second node 112. In other embodiments, the second node 112 may receive information from another structure in the communications system 100 through the receiving port 1705. Since the receiving port 1705 may be in communication with the processor 1703, the receiving port 1705 may then send the received information to the processor 1703. The receiving port 1705 may also be configured to receive other information.

The processor 1703 in the second node 112 may be further configured to transmit or send information to e.g., the first node 111, the third node 113, the fourth node 114, the fifth node 115, the sixth node 116, the seventh node 117, the eighth node 118, the ninth node 119, any of the at least two endpoints 120, 130, and/or another structure in the communications system 100, through a sending port 1706, which may be in communication with the processor 1703, and the memory 1704.

Those skilled in the art will also appreciate that the units 1701-1702 described above may refer to a combination of analog and digital circuits, and/or one or more processors configured with software and/or firmware, e.g., stored in memory, that, when executed by the one or more processors such as the processor 1703, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The units 1701-1702 described above may be the processor 1703 of the second node 112, or an application running on such processor.

Thus, the methods according to the embodiments described herein for the second node 112 may be respectively implemented by means of a computer program 1707 product, comprising instructions, i.e., software code portions, which, when executed on at least one processor 1703, cause the at least one processor 1703 to carry out the actions described herein, as performed by the second node 112. The computer program 1707 product may be stored on a computer-readable storage medium 1708. The computer-readable storage medium 1708, having stored thereon the computer program 1707, may comprise instructions which, when executed on at least one processor 1703, cause the at least one processor 1703 to carry out the actions described herein, as performed by the second node 112. In some embodiments, the computer-readable storage medium 1708 may be a non-transitory computer-readable storage medium, such as a CD ROM disc, a memory stick, or stored in the cloud space. In other embodiments, the computer program 1707 product may be stored on a carrier containing the computer program, wherein the carrier is one of an electronic signal, optical signal, radio signal, or the computer-readable storage medium 1708, as described above.

The second node 112 may comprise an interface unit to facilitate communications between the second node 112 and other nodes or devices, e.g., the first node 111, the third node 113, the fourth node 114, the fifth node 115, the sixth node 116, the seventh node 117, the eighth node 118, the ninth node 119, any of the at least two endpoints 120, 130, and/or another structure in the communications system 100. In some particular examples, the interface may, for example, include a transceiver configured to transmit and receive radio signals over an air interface in accordance with a suitable standard.

In other embodiments, the second node 112 may comprise the following arrangement depicted in FIG. 17*b*. The second node 112 may comprise a processing circuitry 1703, e.g., one or more processors such as the processor 1703, in the second node 112 and the memory 1704. The second node 112 may also comprise a radio circuitry 1709, which may comprise e.g., the receiving port 1705 and the sending port 1706. The processing circuitry 1703 may be configured to, or operable to, perform the method actions according to FIG. 5, FIG. 6, and/or FIGS. 7-14, in a similar manner as that described in relation to FIG. 17*a*. The radio circuitry 1709 may be configured to set up and maintain at least a wireless connection with the first node 111, the third node 113, the fourth node 114, the fifth node 115, the sixth node 116, the seventh node 117, the eighth node 118, the ninth node 119, any of the at least two endpoints 120, 130, and/or another structure in the communications system 100.

Hence, embodiments herein also relate to the second node 112 operative to handle encrypted traffic in the communications system 100, the second node 112 being operative to operate in the communications system 100. The second node 112 may comprise the processing circuitry 1703 and the memory 1704, said memory 1704 containing instructions executable by said processing circuitry 1703, whereby the second node 112 is further operative to perform the actions described herein in relation to the second node 112, e.g., in FIG. 5, FIG. 6, and/or FIGS. 7-14.

Figure 18:
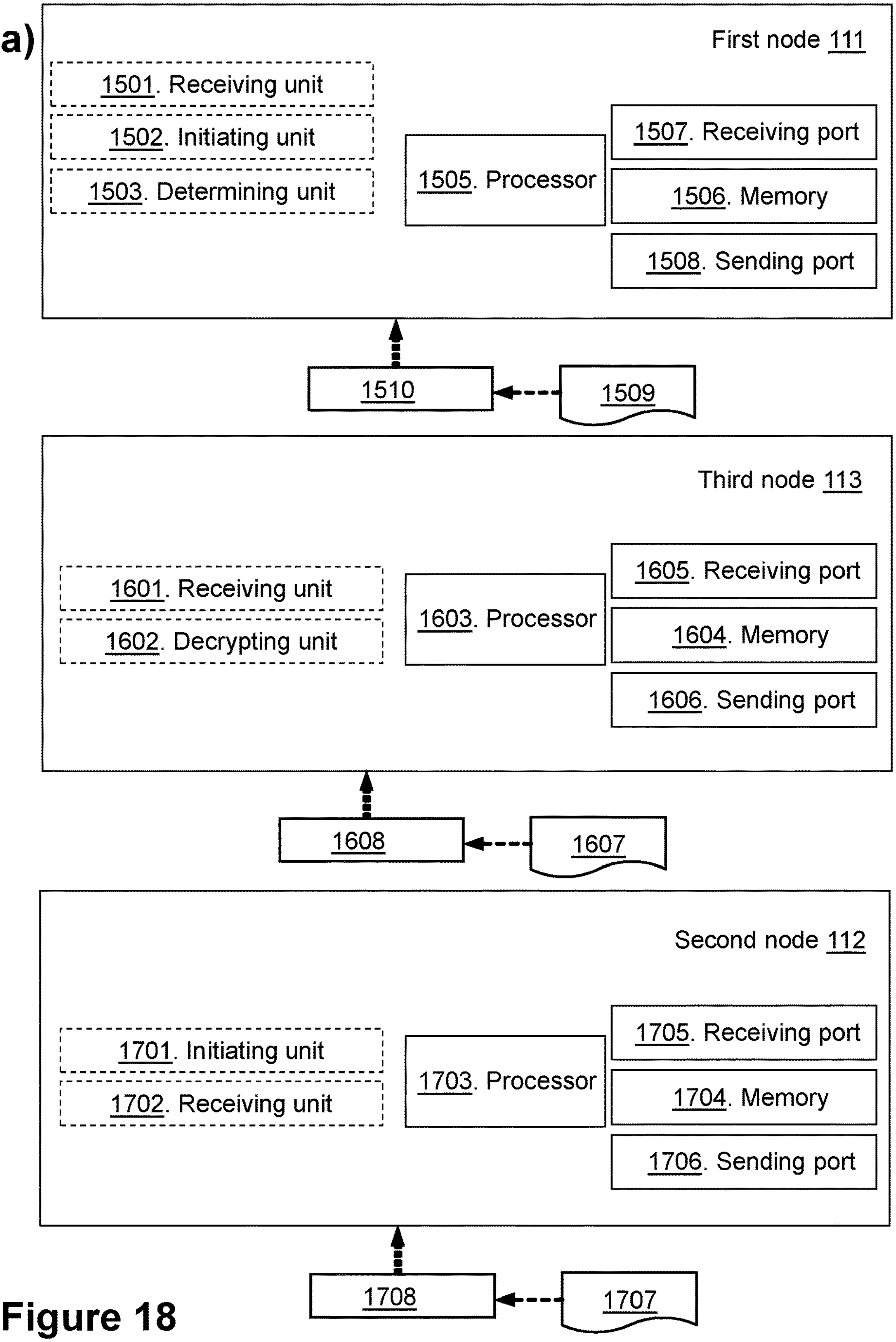
FIG. 18 is a schematic block diagram illustrating two non-limiting examples, a) and b), of a communications system, according to embodiments herein.
Figure 18:
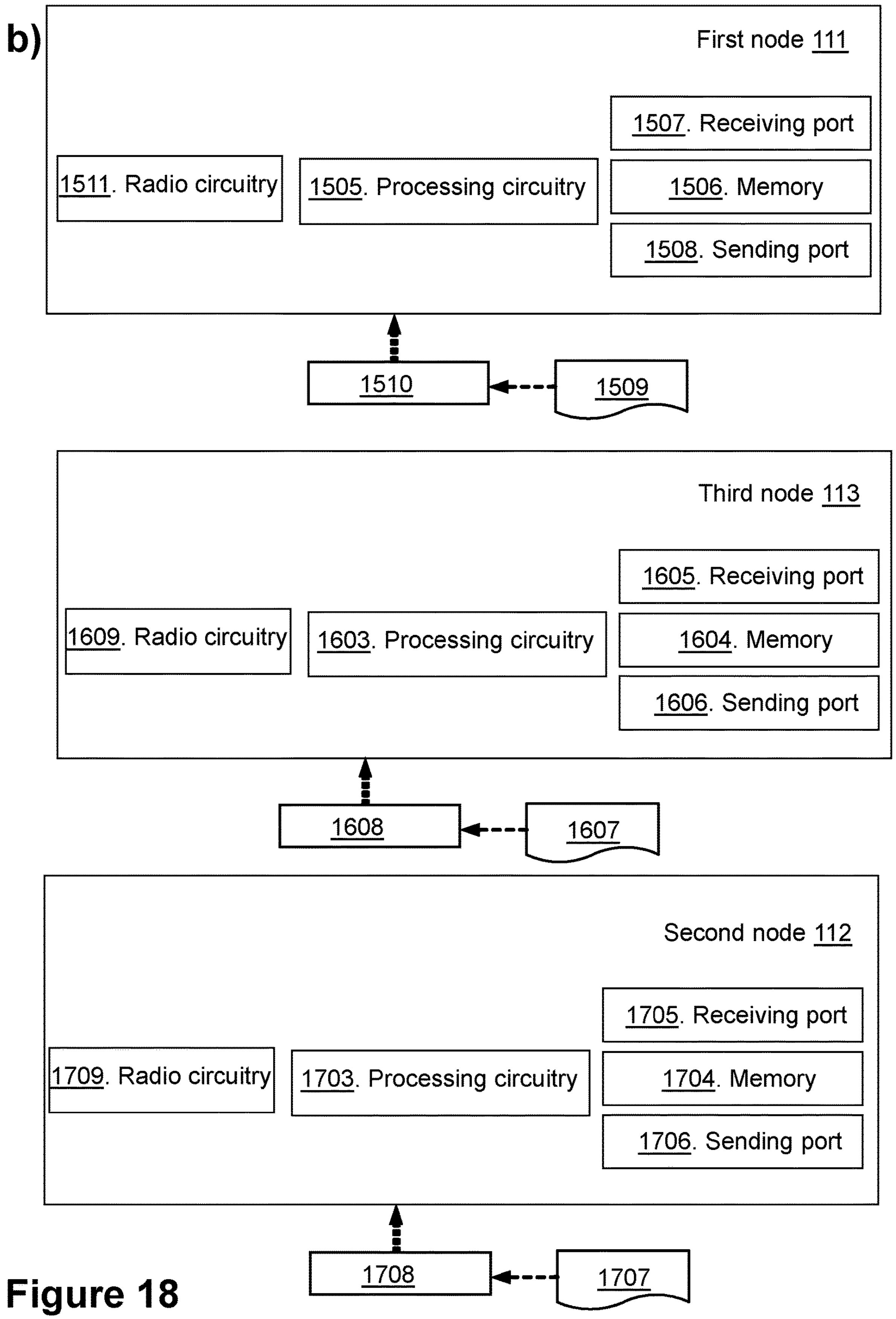

FIG. 18 depicts two different examples in panels a) and b), respectively, of the arrangement that the communications system 100 may comprise to perform the method actions described above in relation to FIG. 6. The arrangement depicted in panel a) corresponds to that described in relation to panel a) in FIG. 15, FIG. 16 and FIG. 17 for each of the first node 111, the third node 113 and the second node 112, respectively. The arrangement depicted in panel b) corresponds to that described in relation to panel b) in FIG. 15, FIG. 16 and FIG. 17 for each of the first node 111, the third node 113 and the second node 112, respectively. The communications system 100 may be for handling encrypted traffic in the communications system 100.

The communications system 100 is configured to, e.g., by means of the initiating unit 1701 within the second node 112, configured to, initiate providing, by the second node 112 configured to operate in the communications system 100, to the first node 111 configured to operate in the communications system 100, the one or more keys and the one or more indications. The one or more keys are configured to enable decryption of traffic configured to be routed between two or more endpoints 130, 120 via the communications system 100. The traffic is configured to be encrypted between the two or more endpoints 130, 120. The first node 111 is configured to be different from any of the two or more endpoints 130, 120. The one or more indications are configured to indicate the respective protocol to be used with the one or more keys to enable decryption of the encrypted traffic.

The communications system 100 is configured to, e.g. by means of the receiving unit 1501 within the first node 111, configured to, receive, by the first node 111, directly, or indirectly, from the second node 112: the one or more keys, and the one or more indications.

The communications system 100 is configured to, e.g., by means of the initiating unit 1502 within the first node 111, configured to, initiate sending, by the first node 111, the one or more keys and the one or more indications to the third node 113, thereby being configured to enable decryption of the encrypted traffic. The first node 111 and the third node 113 are configured to be different from any of the two or more endpoints 130, 120.

The communications system 100 is configured to, e.g., by means of the receiving unit 1601 within the first node 111, configured to receive, by the third node 113, from the first node 111: the one or more keys, the one or more indications, and the one or more second indications configured to indicate the session between the two or more endpoints 130, 120 for which decryption with the one or more keys is configured to be applicable.

The communications system 100 is configured to, e.g., by means of the decrypting unit 1602 within the third node 113, configured to decrypt, by the third node 113, the traffic for the session configured to be indicated with the one or more keys configured to be received, according to the respective protocol, to perform the management operation on the traffic.

In some embodiments, the communications system 100 may be further configured to, e.g., by means of the determining unit 1503 within the first node 111, configured to determine, by the first node 111, the need to decrypt the traffic.

In some embodiments, the communications system 100 may be further configured to, e.g., by means of the initiating unit 1502 within the first node 111, configured to initiate, by the first node 111, fetching the one or more keys from the second node 112. The initiating fetching may be configured to be based on the need to decrypt configured to be determined.

In some embodiments, the communications system 100 may be further configured to, e.g., by means of the receiving unit 1501 within the first node 111, configured to, receive, by the first node 111, the first indication configured to indicate that the second node 112 is configured to have the capability to provide the one or more keys to decrypt the traffic, and wherein the initiating of the fetching may be configured to be based on the first indication configured to be received.

In some of such embodiments, the communications system 100 may be further configured to, e.g., by means of the receiving unit 1702 configured to, receive, by the second node 112, a) the third indication configured to provide the one or more keys to the first node 111, and b) the one or more second indications of the session between the two or more endpoints 130, 120 for which decryption may be configured to be enabled. The initiating providing may be configured to be based on the third indication and one or more second indications configured to be received.

In some embodiments, the communications system 100 may be further configured to, e.g., by means of an initiating unit 1701 within the second node 112, configured to, initiate sending, by the second node 112, the first indication to the first node 111. The first indication may be configured to indicate that the second node 112 may be configured to have the capability to provide the one or more keys to decrypt the traffic, and the third indication configured to be received may be configured to be based on the first indication configured to be sent.

The remaining configurations described for the first node 111, the third node 113 and the second node 112 in relation to FIG. 18, may be understood to correspond to those described in FIG. 15, FIG. 16, and FIG. 17, respectively, and to be performed, e.g., by means of the corresponding units and arrangements described in FIG. 15, FIG. 16, and FIG. 17, which will not be repeated here.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCE

3GPP TS 29.522 v16.5.0 (September 2020): 5G System; Network Exposure Function Northbound APIs; Stage 3.

The invention claimed is:

1. A computer-implemented method of handling encrypted traffic in a communications system, the method performed by a first node configured to manage or control policies in the communications system, the method comprising:

receiving, directly, or indirectly, from a second node configured to provide content to users of the communications system one or more keys to enable decryption of encrypted traffic, by a third node configured to support handling of user plane traffic based on one or more rules and to implement enforcement actions in the user plane traffic in the communications system, the encrypted traffic being routed between two or more endpoints via the communications system, the encrypted traffic being encrypted between the two or more endpoints, and one or more encryption protocol indications, the one or more encryption protocol indications indicating an encryption protocol to be used with the one or more keys to enable decryption of the encrypted traffic, and initiating sending the one or more keys and the one or more encryption protocol indications to the third node, thereby enabling decryption of the encrypted traffic;

wherein the first node and the third node are different from any of the two or more endpoints.

2. The method according to claim 1, wherein at least one of:

the encrypted traffic belongs to an established session between the two or more endpoints, and wherein the one or more keys are sent and valid during the established session; and the encrypted traffic comprises a plurality of flows, and the one or more indications further indicate, for each flow of the plurality of flows, a respective key, of the one or more keys, that enables decryption.

3. The method according to claim 1, the method further comprising:

determining a need to decrypt the encrypted traffic, and initiating fetching the one or more keys from the second node, wherein the initiating fetching is based on the determined need to decrypt.

4. The method according to claim 3, the method further comprising:

receiving a first indication indicating that the second node configured to provide the one or more keys to decrypt the traffic, and wherein the initiating of the fetching is based on the received first indication.

5. The method according to claim 4, wherein the receiving of the first indication further comprises receiving one or more second indications indicating a session between the two or more endpoints for which decryption with the one or more keys is applicable.

6. The method according to claim 5, wherein the one or more second indications indicate at least one of:

one or more applications for which the second node supports the capability, and wherein the initiating sending the one or more keys and the one or more indications further comprises initiating sending the one or more second indications, and at least one of the two or more endpoints.

7. The method according to claim 4, wherein the first indication is received for at least one of the two or more endpoints indicated by the first node.

8. The method according to claim 1, wherein the first node is a Policy Charging Function (PCF) the second node is an Application Function (AF) and the third node is a User Plane Function (UPF) or another node operating in the communications system.

9. A computer-implemented method of handling encrypted traffic in a communications system, the method performed by a third node configured to support handling of user plane traffic based on one or more rules and to implement enforcement actions in the user plane traffic, the method comprising:

receiving, from a first node configured to manage or control policies in the communications system:

a) one or more keys to enable decryption of encrypted traffic routed between two or more endpoints via the communications system, the traffic being encrypted between the two or more endpoints, b) one or more encryption protocol indications indicating an encryption protocol to be used with the one or more keys to enable decryption of the encrypted traffic, and c) one or more second indications indicating a session between the two or more endpoints for which decryption with the one or more keys is applicable; and decrypting the traffic for the indicated session with the received one or more keys, according to the encryption protocol indicated in the one or more encryption protocol indications, to perform a management operation on the encrypted traffic;

wherein the first node and the third node are different from any of the two or more endpoints.

10. The method according to claim 9, wherein at least one of:

the encrypted traffic belongs to the session, established between the two or more endpoints, and wherein the one or more keys are received and valid during the established session, and the encrypted traffic comprises a plurality of flows, and the one or more indications further indicate, for each flow of the plurality of flows, a respective key, of the one or more keys, that enables decryption.

11. The method according to claim 9, wherein the one or more second indications indicate at least one of:

one or more applications for which decryption with the one or more keys is applicable, and at least one of the two or more endpoints.

12. The method according to claim 11, wherein the first node is a Policy Charging Function (PCF) and the third node is a User Plane Function (UPF).

13. A computer-implemented method of handling encrypted traffic in a communications system, the method performed by a second node configured to provide content to users of, the method comprising:

initiating providing, to a first node configured to manage or control policies in the communications system in the communications system, one or more keys and one or more encryption protocol indications, the one or more keys enabling decryption of traffic routed between two or more endpoints via the communications system, the traffic being encrypted between the two or more endpoints, the first node being different from any of the two or more endpoints, and the one or more encryption protocol indications indicating an encryption protocol to be used with the one or more keys to enable decryption of the encrypted traffic.

14. The method according to claim 13, wherein at least one of:

the encrypted traffic belongs to an established session between the two or more endpoints, and wherein the one or more keys are sent and valid during the established session, and the encrypted traffic comprises a plurality of flows, and the one or more indications further indicate, for each flow of the plurality of flows, a respective key, of the one or more keys, that enables decryption.

15. The method according to claim 13, the method further comprising:

receiving a) a third indication to provide the one or more keys to the first node, and b) one or more second indications of a session between the two or more endpoints for which decryption is to be enabled, and wherein the initiating providing is based on the received third indication and one or more second indications.

16. The method according to claim 15, the method further comprising:

initiating sending a first indication to the first node, the first indication indicating that the second node is configured to provide the one or more keys to decrypt the traffic, and wherein the received third indication is based on the sent first indication.

17. The method according to claim 16, wherein the initiating sending of the first indication further comprises initiating sending the one or more second indications indicating a session between the two or more endpoints for which decryption with the one or more keys is applicable.

18. The method according to the claim 17, wherein the one or more second indications indicate at least one of:

one or more applications for which the second node supports the capability; and at least one of the two or more endpoints.

19. The method according to claim 13, wherein the first node is a Policy Charging Function (PCF) and the second node is an Application Function (AF).

* * * * *